(12) United States Patent
Jung et al.

(10) Patent No.: US 12,254,173 B2
(45) Date of Patent: Mar. 18, 2025

(54) ELECTRONIC DEVICE FOR PROCESSING A TOUCH INPUT AND OPERATION METHOD THEREFOR

(71) Applicant: SAMSUNG ELECTRONICS CO., LTD., Suwon-si (KR)

(72) Inventors: Minhyo Jung, Suwon-si (KR); Seongoh Lee, Suwon-si (KR); Youngmin Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/338,848

(22) Filed: Jun. 21, 2023

(65) Prior Publication Data
US 2023/0350565 A1   Nov. 2, 2023

Related U.S. Application Data

(63) Continuation of application No. PCT/KR2021/019606, filed on Dec. 22, 2021.

(30) Foreign Application Priority Data

Dec. 22, 2020   (KR) .................... 10-2020-0181178

(51) Int. Cl.
  *G06F 3/04883*   (2022.01)
  *G06F 3/041*   (2006.01)

(52) U.S. Cl.
  CPC ........ *G06F 3/04883* (2013.01); *G06F 3/0416* (2013.01)

(58) Field of Classification Search
  CPC ...... G06F 3/0416; G06F 3/038; G06F 3/0383; G06F 3/03545; G06F 3/04186; G06F 3/04883; G06F 3/04845; G06F 2203/0382
  See application file for complete search history.

(56) References Cited

U.S. PATENT DOCUMENTS 8,952,906 B2   2/2015   Lee
9,323,386 B2   4/2016   Kang
(Continued)

FOREIGN PATENT DOCUMENTS

EP   3072038   9/2016
JP   5973086 B2   7/2016
(Continued)

OTHER PUBLICATIONS

Explore Display 21 TSP (Touch Screen Panel) types and principles, Samsung Display, Jan. 18, 2018, 4 pages.
(Continued)

*Primary Examiner* — Yaron Cohen
(74) *Attorney, Agent, or Firm* — Nixon & Vanderhye, P.C.

(57) ABSTRACT

According to various example embodiments, an electronic device and an operation method thereof are disclosed. The disclosed electronic device includes: a display; a touch sensitive panel; a memory storing one or more instructions; and a processor configured to execute the one or more instructions stored in the memory to: receive a touch input through the touch sensitive panel, detect a change of a size of the touch input received for a specified time, identify a brush stroke corresponding to the detected change of the size of the touch input among a plurality of brush strokes, obtain trajectory information corresponding to the touch input from a database corresponding to the identified brush stroke, and process the touch input according to the obtained trajectory information corresponding to the touch input and output the processed touch input on the display.

16 Claims, 15 Drawing Sheets

(56) References Cited

U.S. PATENT DOCUMENTS

| | | | |
|---|---|---|---|
| 9,582,117 B2 | 2/2017 | Wyrwas et al. | |
| 10,025,492 B2 | 7/2018 | Pellikka | |
| 2012/0054665 A1 | 3/2012 | Kano et al. | |
| 2013/0212511 A1 | 8/2013 | Kim et al. | |
| 2019/0012027 A1* | 1/2019 | Park | G06F 3/017 |
| 2019/0163320 A1 | 5/2019 | Park et al. | |

FOREIGN PATENT DOCUMENTS

| | | | |
|---|---|---|---|
| KR | 20060096208 A | 9/2006 | |
| KR | 101080255 B1 | 11/2011 | |
| KR | 101106628 B1 | 1/2012 | |
| KR | 20130091874 A | 8/2013 | |
| KR | 20180015987 A | 2/2018 | |
| KR | 101901234 B1 | 9/2018 | |
| KR | 20180003367 U | 12/2018 | |
| KR | 20190130248 A | 11/2019 | |
| KR | 102388590 B1 | 4/2022 | |
| KR | 20220090209 A | 6/2022 | |

OTHER PUBLICATIONS

Types of touch screen panels by principle and technology, INI R & C, Sep. 2014, 16 pages.
Extended European Search Report dated Apr. 11, 2024 issued in European Patent Application No. 21911523.5.

* cited by examiner

FIG. 8B

BRUSH STROKE DB 800

| TOUCH ID | TOUCH EVENT ID | LOCATION | SIZE | OCCURRENCE TIME | POSITION VECTOR | VELOCITY VECTOR | ALTITUDE ANGLE | AZIMUTH ANGLE | TOUCH TYPE | BRUSH STROKE TYPE |
|---|---|---|---|---|---|---|---|---|---|---|
| 1001 | 1 | 100,100 | 0.58 | 20200820T13:20:10*633+0000 | *** | *** | 15 | 56 | down | ECCENTRIC BRUSH STROKE |
| 1001 | 2 | 100,100 | 0.59 | 20200820T13:20:10*643+0000 | *** | *** | 16 | 59 | move | ECCENTRIC BRUSH STROKE |
| 1001 | 3 | 102,110 | 0.45 | 20200820T13:20:10*653+0000 | *** | *** | 17 | 58 | move | ECCENTRIC BRUSH STROKE |
| 1001 | 4 | 105,120 | 0.25 | 20200820T13:20:10*663+0000 | *** | *** | 18 | 60 | up | ECCENTRIC BRUSH STROKE |
| 1002 | 1 | 1501,25 | 1 | 20200820T13:20:11*633+0000 | *** | *** | 77 | 280 | down | ECCENTRIC BRUSH STROKE |
| 1002 | 2 | 1405,25 | 0.88 | 20200820T13:20:11*643+0000 | *** | *** | 76 | 270 | move | ECCENTRIC BRUSH STROKE |
| 1002 | 3 | 1400,65 | 0.75 | 20200820T13:20:11*653+0000 | *** | *** | 75 | 260 | move | ECCENTRIC BRUSH STROKE |
| 1002 | 4 | 1365,85 | 0.48 | 20200820T13:20:11*663+0000 | *** | *** | 76 | 250 | up | ECCENTRIC BRUSH STROKE |
| 2001 | 1 | 200,100 | 0.58 | 20200820T20:20:10*633+0000 | *** | *** | 19 | 64 | down | MIDDLE BRUSH STROKE |
| 2001 | 2 | 201,100 | 0.59 | 20200820T20:20:10*633+0000 | *** | *** | 20 | 63 | move | MIDDLE BRUSH STROKE |
| 2001 | 3 | 202,110 | 0.60 | 20200820T20:20:10*633+0000 | *** | *** | 21 | 61 | move | MIDDLE BRUSH STROKE |
| 2001 | 4 | 205,120 | 0.59 | 20200820T20:20:10*633+0000 | *** | *** | 22 | 64 | up | MIDDLE BRUSH STROKE |
| 2002 | 1 | 2501,25 | 0.76 | 20200822T13:20:10*633+0000 | *** | *** | 74 | 21 | down | MIDDLE BRUSH STROKE |
| 2002 | 2 | 2405,25 | 0.88 | 20200822T13:20:10*633+0000 | *** | *** | 75 | 23 | move | MIDDLE BRUSH STROKE |
| 2002 | 3 | 2400,65 | 0.89 | 20200822T13:20:10*633+0000 | *** | *** | 75 | 25 | move | MIDDLE BRUSH STROKE |
| 2002 | 4 | 2365,85 | 0.91 | 20200822T13:20:10*633+0000 | *** | *** | 74 | 26 | up | MIDDLE BRUSH STROKE |

FIG. 14

BRUSH STROKE DB 800

| TOUCH ID 805 | TOUCH EVENT ID 810 | LOCATION 815 | SIZE 820 | OCCURRENCE TIME 825 | POSITION VECTOR 830 | VELOCITY VECTOR 835 | ALTITUDE ANGLE 840 | AZIMUTH ANGLE 845 | TOUCH TYPE 850 | BRUSH STROKE TYPE 855 |
|---|---|---|---|---|---|---|---|---|---|---|
| 1001 | 1 | 100,100 | 0.58 | 20200820T13:20:10*633+0000 | *** | *** | 15 | 56 | down | ECCENTRIC BRUSH STROKE |
| 1001 | 2 | 100,100 | 0.59 | 20200820T13:20:10*643+0000 | *** | *** | 16 | 59 | move | ECCENTRIC BRUSH STROKE |
| 1001 | 3 | 102,110 | 0.45 | 20200820T13:20:10*653+0000 | *** | *** | 17 | 58 | move | ECCENTRIC BRUSH STROKE |
| 1001 | 4 | 105,120 | 0.25 | 20200820T13:20:10*663+0000 | *** | *** | 18 | 60 | up | ECCENTRIC BRUSH STROKE |
| 1002 | 1 | 1501,25 | 1 | 20200820T13:20:11*633+0000 | *** | *** | 77 | 280 | down | ECCENTRIC BRUSH STROKE |
| 1002 | 2 | 1405,25 | 0.88 | 20200820T13:20:11*643+0000 | *** | *** | 76 | 270 | move | ECCENTRIC BRUSH STROKE |
| 1002 | 3 | 1400,65 | 0.75 | 20200820T13:20:11*653+0000 | *** | *** | 75 | 260 | move | ECCENTRIC BRUSH STROKE |
| 1002 | 4 | 1365,85 | 0.48 | 20200820T13:20:11*663+0000 | *** | *** | 76 | 250 | up | ECCENTRIC BRUSH STROKE |
| 2001 | 1 | 200,100 | 0.58 | 20200820T20:20:10*633+0000 | *** | *** | 19 | 64 | down | MIDDLE BRUSH STROKE |
| 2001 | 2 | 201,100 | 0.59 | 20200820T20:20:10*633+0000 | *** | *** | 20 | 63 | move | MIDDLE BRUSH STROKE |
| 2001 | 3 | 202,110 | 0.60 | 20200820T20:20:10*633+0000 | *** | *** | 21 | 61 | move | MIDDLE BRUSH STROKE |
| 2001 | 4 | 205,120 | 0.59 | 20200820T20:20:10*633+0000 | *** | *** | 22 | 64 | up | MIDDLE BRUSH STROKE |
| 2002 | 1 | 2501,25 | 0.76 | 20200822T13:20:10*633+0000 | *** | *** | 74 | 21 | down | MIDDLE BRUSH STROKE |
| 2002 | 2 | 2405,25 | 0.88 | 20200822T13:20:10*633+0000 | *** | *** | 75 | 23 | move | MIDDLE BRUSH STROKE |
| 2002 | 3 | 2400,65 | 0.89 | 20200822T13:20:10*633+0000 | *** | *** | 75 | 25 | move | MIDDLE BRUSH STROKE |
| 2002 | 4 | 2365,85 | 0.91 | 20200822T13:20:10*633+0000 | *** | *** | 74 | 26 | up | MIDDLE BRUSH STROKE |

CANDIDATE TOUCH EVENT SET (rows with TOUCH ID 1002)

EXTRACTION OF ALTITUDE ANGLE AND AZIMUTH ANGLE

ELECTRONIC DEVICE FOR PROCESSING A TOUCH INPUT AND OPERATION METHOD THEREFOR

CROSS-REFERENCE TO RELATED APPLICATIONS

This application is a continuation of International Application No. PCT/KR2021/019606 designating the United States, filed on Dec. 22, 2021, in the Korean Intellectual Property Receiving Office and claiming priority to Korean Patent Application No. 10-2020-0181178, filed on Dec. 22, 2020, in the Korean Intellectual Property Office, the disclosures of which are incorporated by reference herein in their entireties.

BACKGROUND

Field

The disclosure relates to an electronic device and an operation method thereof, and for example, to an electronic device capable of processing a touch input through a passive stylus, and an operation method thereof.

Description of Related Art

Applications have been developed, which allows a user to directly touch a screen using an active stylus or a passive stylus in an electronic device including a touch panel, such as a large interactive whiteboard, a smartphone, or a tablet, and draw or write on a display according to the touch.

The active stylus is a type of mobile device with a processor and a gyro sensor. When azimuth or altitude angle information is measured in real time for each touch input and transmitted to a touch panel device, the touch panel device may process the touch input based on such information. In the case of the active stylus, compatible panels are limited according to characteristics of the stylus, and the panel needs to prepare an operating system and the like accordingly. In addition, the active stylus is expensive and has inconvenience such as charging, compared to the passive stylus.

The passive stylus refers to a device or means, such as a human finger or a traditional pencil, which may touch a surface of a touch device rather than an electronic device. Because the passive stylus is unable to generate or transmit special information, the touch panel device processes a touch input by measuring the position or force of the touch input, the size of the touched area, and the like. Therefore, in an application using a passive stylus, it is difficult to measure azimuth or altitude angle information, and information that is obtained from a panel using a passive stylus is inevitably limited.

However, in order to develop a drawing application that simulates reality well and has high-quality graphic expression, azimuth or altitude angle information of an input device is required. In particular, in the case of a drawing application for ink painting in which a brush tip and a degree of laying of a brush have a great influence on the quality of a picture, azimuth or altitude angle information of an input device may be further required.

SUMMARY

Embodiments of the disclosure provide an electronic device that may previously obtain azimuth or altitude angle information using an active stylus, and thus, even when a touch input from a passive stylus is received, may process the touch input using previously obtained azimuth or altitude angle information, and an operation method therefor.

According to various example embodiments, an electronic device and an operation method thereof are provided. The electronic device includes: a display; a touch sensitive panel; a memory storing one or more instructions; and a processor configured to execute the one or more instructions stored in the memory to: receive a touch input through the touch sensitive panel, detect a change of a size of the touch input received for a specified time, identify a brush stroke corresponding to the detected change of the size of the touch input among a plurality of brush strokes, obtain trajectory information corresponding to the touch input from a database corresponding to the identified brush stroke; and process the touch input according to the obtained trajectory information corresponding to the touch input and output the processed touch input on the display.

According to various example embodiments of the present disclosure, a database is configured in advance according to a brush stroke using an active stylus. Therefore, even when users draw with an inexpensive and highly versatile passive stylus, azimuth and altitude angle information is obtained according to a touch input, and thus, more luxurious and higher-quality drawing work results may be obtained.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 14 is a diagram illustrating an example process of searching for a candidate touch event set in a brush stroke database, according to various embodiments.

DETAILED DESCRIPTION

Figure 1:
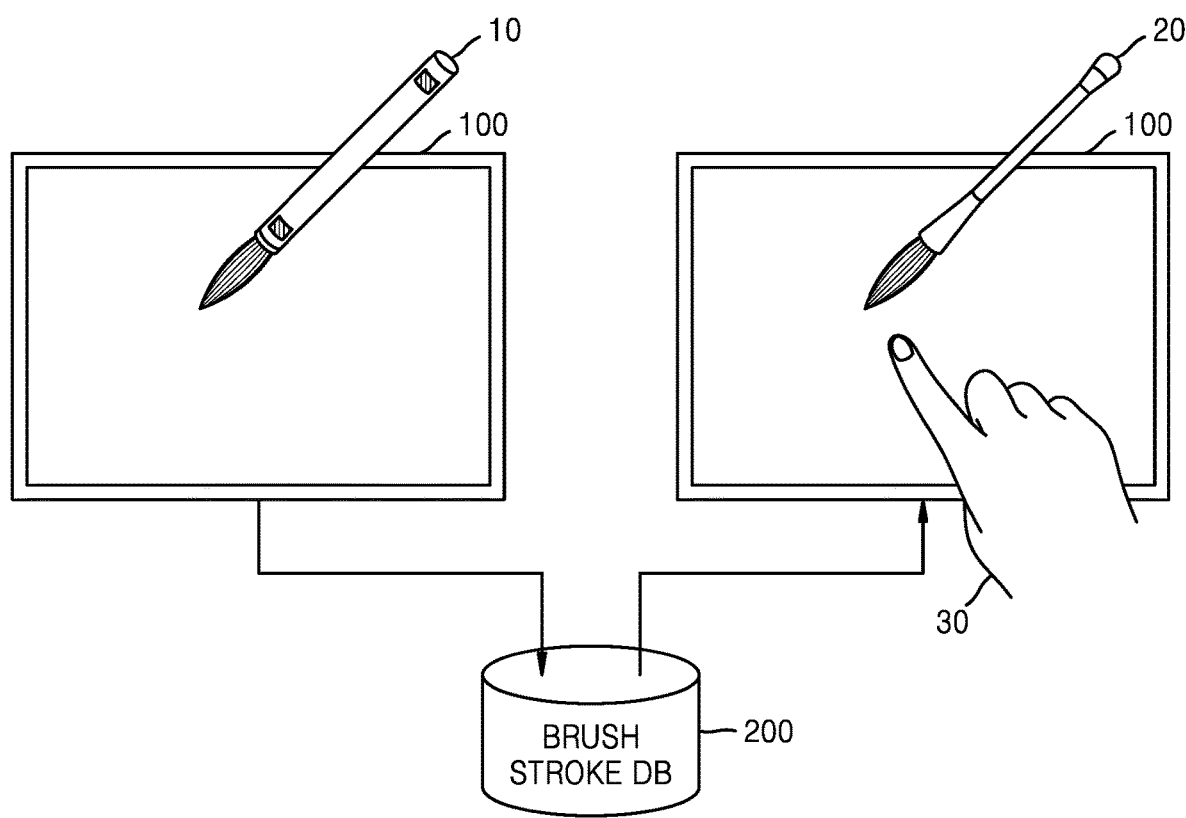
FIG. 1 is a diagram illustrating an example concept of an electronic device capable of processing a touch input using azimuth or altitude angle information for the touch input through a passive stylus, according to various embodiments.

According to an example embodiment, an electronic device includes: a display; a touch sensitive panel; a memory storing one or more instructions; and a processor configured to execute the one or more instructions stored in the memory to: receive a touch input through the touch sensitive panel, detect a change of the size of the touch input received for a specified time, identify a brush stroke corresponding to the detected change of the size of the touch input among a plurality of brush strokes, obtain trajectory information corresponding to the touch input from a database corresponding to the identified brush stroke, and process the touch input according to the obtained trajectory information corresponding to the touch input and output the processed touch input on the display.

According to an example embodiment, the processor may be further configured to execute the one or more instructions to: detect the change of the size of the touch input based on a difference between a size of a touch event detected at a first time point and a size of a touch event detected at a second time point among a plurality of touch events of the touch input.

According to an example embodiment, the processor may be further configured to execute the one or more instructions to: identify the brush stroke as a first brush stroke based on a change of the size of an area corresponding to the touch input exceeding a specified threshold value and identify the brush stroke as a second brush stroke based on the change of the size of the area corresponding to the touch input not exceeding the specified threshold value.

According to an example embodiment, the memory may include a plurality of databases respectively corresponding to the plurality of brush strokes, and each of the plurality of databases respectively corresponding to the plurality of brush strokes may include pieces of information about a plurality of trajectories obtained by performing a touch input according to a corresponding brush stroke using an active stylus.

According to an example embodiment, the trajectory information corresponding to the plurality of brush strokes may include trajectory information corresponding to a first brush stroke and trajectory information corresponding to a second brush stroke, the trajectory information corresponding to the first brush stroke may include a plurality of trajectory information obtained by performing a plurality of touch inputs according to the first brush stroke, each of the plurality of trajectory information may including information about a plurality of touch events included in a touch input representing each trajectory, and the trajectory information corresponding to the second brush stroke may include a plurality of trajectory information obtained by performing a plurality of touch inputs according to the second brush stroke, each of the plurality of trajectory information including information about a plurality of touch events included in a touch input representing each trajectory.

According to an example embodiment, the information about the plurality of touch events may include at least one of an occurrence location of the touch event, a size of an area of the touch event, an occurrence time of the touch event, a position vector, a velocity vector, an altitude angle, and an azimuth angle.

According to an example embodiment, the processor may be further configured to execute the one or more instructions to: based on the received touch input being identified as the first brush stroke, obtain a database corresponding to the first brush stroke; search for a candidate touch event from the database corresponding to the first brush stroke using a position vector and a velocity vector of each of the touch events included in the touch input; and obtain altitude or azimuth angle information from information about the found candidate touch event, and process the touch input using the altitude or azimuth angle information.

According to an example embodiment, the processor may be further configured to execute the one or more instructions to: determine, as the candidate touch event, a touch event in which a difference between a position vector and a velocity vector of each of the touch events included in the touch input and a position vector and a velocity vector of the touch events in the database corresponding to the first brush stroke is less than a threshold value.

According to an example embodiment, the processor may be further configured to execute the one or more instructions to: based on the received touch input being identified as the first brush stroke obtain a database corresponding to the first brush stroke; search for a candidate touch event from the database corresponding to the first brush stroke using a change of the position or a change of the size of each of the touch events included in the touch input; and obtain altitude or azimuth angle information from information about the found candidate touch event, and process the touch input using the altitude or azimuth angle information.

According to an example embodiment, a method of operating an electronic device including a display and a touch sensitive panel includes: receiving a touch input through the touch sensitive panel; detecting a change of the size of the touch input received for a specified time; identifying a brush stroke corresponding to the detected change of the size of the touch input among a plurality of brush strokes; obtaining trajectory information corresponding to the touch input from a database corresponding to the identified brush stroke; and processing the touch input according to the obtained trajectory information corresponding to the touch input and outputting the processed touch input on the display.

According to an example embodiment, a non-transitory computer-readable recording medium having recorded thereon one or more programs executable by a processor of an electronic device including a display and a touch sensitive panel, which, when executed, causes an electronic device to perform operations comprising: receiving a touch input through the touch sensitive panel; detecting a change of the size of the touch input received for a specified time; identifying a brush stroke corresponding to the detected change of the size of the touch input among a plurality of brush strokes; obtaining trajectory information corresponding to the touch input from a database corresponding to the identified brush stroke; and processing the touch input according to the obtained trajectory information corresponding to the touch input and outputting the processed touch input on the display.

The terms as used herein are briefly described, and the present disclosure is described in greater detail.

As for the terms as used in the present disclosure, common terms that are currently widely used are selected as much as possible while taking into account the functions in the present disclosure. However, the terms may vary depending on the intention of those of ordinary skill in the art, precedents, the emergence of new technology, and the like. Also, in a specific case, arbitrarily selected terms may be used. In this case, the meaning of the terms will be described in detail in the description of the present disclosure. Therefore, the terms as used in the present disclosure should be defined based on the meaning of the terms and the description throughout the present disclosure rather than simply the names of the terms.

Throughout the disclosure, the expression "a portion includes a certain element" may refer, for example, to a portion further including other elements rather than excludes other elements unless otherwise stated. Also, the terms such as "unit" and "module" described in the disclosure may refer, for example, to units that process at least one function or operation, and may be implemented as hardware, software, or a combination of hardware and software.

Hereinafter, various example embodiments will be described in greater detail with reference to the accompanying drawings. However, the present disclosure may be implemented in various different forms and is not limited to the example embodiments described herein. In order to clearly explain the present disclosure, parts irrelevant to the description may be omitted in the drawings, and similar reference numerals are assigned to similar parts throughout the disclosure and drawings.

The term "user" as used in disclosure may refer, for example, to a person who controls functions or operations of a computing device or an electronic device using a control device, and may include a viewer, an administrator, or an installer.

FIG. 1 is a diagram illustrating an example concept of an electronic device capable of processing a touch input using azimuth or altitude angle information for the touch input through a passive stylus, according to various embodiments.

Referring to FIG. 1, when a touch input according to one or more brush strokes is performed on an electronic device 100 using an active stylus 10, a database (DB) 200 for each brush stroke may be generated based on the received touch input according to the one or more brush strokes.

According to an embodiment, the electronic device 100 is a device that includes a display and a touch sensitive panel and may receive a touch input through the touch sensitive panel, process the received touch input, and output a touch input processing result on a display. For example, the electronic device 100 may be any type of electronic device, such as an interactive whiteboard, a mobile device, a tablet device, a laptop computer, or a display device.

According to an embodiment, the active stylus 10 may have a brush shape with brush bristles. The active stylus 10 may include one or more sensors capable of measuring an altitude angle and an azimuth angle according to the movement of the active stylus 10, and a communication module capable of performing communication to transmit information obtained by the active stylus 10 to the electronic device 100.

According to an embodiment, the active stylus 10 may perform a touch input according to one or more brush strokes. The brush stroke may indicate how to use a brush in oriental painting or calligraphy. One or more brush strokes may include a first brush stroke and a second brush stroke.

The one or more brush strokes are not limited to the first brush stroke and the second brush stroke and may include various numbers of brush strokes. For example, the one or more brush strokes may include a middle brush stroke and an eccentric brush stroke. The middle brush stroke may represent a brush stroke in which a brush tip is in the middle of stroke so that stroke with a constant thickness is generated, and the eccentric brush stroke may represent a brush stroke in which a brush tip is exposed to one side of stroke. The one or more brush strokes are not limited to the middle brush stroke and the eccentric brush stroke and may include other brush strokes.

According to an embodiment, the active stylus 10 may transmit azimuth and altitude angle information, which is measured for the touch input performed according to the one or more brush strokes, to the electronic device 100 through the communication module. For example, the active stylus 10 may transmit azimuth and altitude angle information, which corresponds to the touch input according to the first brush stroke, to the electronic device 100 through a communication module. For example, the active stylus 10 may transmit azimuth and altitude angle information, which corresponds to the touch input according to the second brush stroke, to the electronic device 100 through the communication module.

According to an embodiment, when the touch input from the active stylus 10 is received, the electronic device 100 may obtain location, size, time, and azimuth and altitude angle information of the corresponding touch input. For example, the location and size information of the touch input may be obtained through the touch sensitive panel. For example, the azimuth and altitude angle information of the touch input may be received from the active stylus 10.

According to an embodiment, the electronic device 100 may generate a brush stroke DB 200 by classifying touch input information according to the brush stroke applied to the touch input received from the active stylus 10 and converting the touch input information into a DB. For example, the electronic device 100 may configure, as a first brush stroke DB, touch input information obtained according to the touch input performed according to the first brush stroke, and may configure, as a second brush stroke DB, touch input information obtained according to the touch input performed according to the second brush stroke.

According to an embodiment, configuring the brush stroke DB 200 using the electronic device 100 may be performed when the electronic device 100 is manufactured. Users may use the electronic device 100 by purchasing the electronic device 100 including the brush stroke DB 200.

According to an embodiment, the electronic device 100 may download, from a server, the brush stroke DB 200 and a drawing application operating using the brush stroke DB 200 and may install the downloaded brush stroke DB 200 and drawing application thereon.

According to an embodiment, when the touch input is received through the passive stylus 10, the electronic device 100 may obtain information of the received touch input, identify the brush stroke based on the obtained information of the touch input, process the touch input using information stored in the brush stroke DB 200 corresponding to the identified brush stroke, and display a processing result on the display.

According to an embodiment, the passive stylus 10 may refer to a device that is unable to obtain azimuth or altitude angle information because the device does not include a sensor that measures azimuth or altitude angle information corresponding to a touch input. For example, the passive stylus 10 may include a user's finger 30, a traditional pen or a traditional brush 20, or other rod-shaped means.

According to an embodiment, when the touch input is received through the passive stylus 10, the electronic device 100 may obtain location, size, and time information of the touch input as information of the received touch input, appropriately process the obtained location, size, and time information of the touch input, and identify the brush stroke corresponding to the touch input using the processed information. According to an example, the electronic device 100 may identify the brush stroke corresponding to the touch input, based on the change of the size of the touch input. For example, when the change of the size of the touch input exceeds a threshold value for a specified time, the electronic device 100 may identify the brush stroke corresponding to the touch input as the eccentric brush stroke. For example, when the change of the size of the touch input does not exceed the threshold value for the specified time, the electronic device 100 may identify the brush stroke corresponding to the touch input as the middle brush stroke.

For example, the electronic device 100 may process the touch input using information stored in the brush stroke DB 200 corresponding to the brush stroke identified for the received touch input, and display a processing result on the display. For example, when the brush stroke corresponding to the received touch input is identified as the eccentric brush stroke, the electronic device 100 may process the touch input using information stored in an eccentric brush stroke DB, and display a processing result on the display. For example, when the brush stroke corresponding to the received touch input is identified as the middle brush stroke, the electronic device 100 may process the touch input using information stored in a middle brush stroke DB, and display a processing result on the display.

According to an embodiment, the electronic device 100 may obtain, from the brush stroke DB corresponding to the received touch input, altitude and azimuth angle information corresponding to the location, size, and time information of the received touch input, and process the touch input using the obtained altitude and azimuth angle information. According to an embodiment, when the brush stroke corresponding to the received touch input is identified as the eccentric brush stroke, the electronic device 100 may obtain, from the eccentric brush stroke DB, altitude and azimuth angle information corresponding to the location, size, and time information of the received touch input, and process the received touch input using the obtained altitude and azimuth angle information. According to an embodiment, when the brush stroke corresponding to the received touch input is identified as the middle brush stroke, the electronic device 100 may obtain, from the middle brush stroke DB, altitude and azimuth angle information corresponding to the location, size, and time information of the received touch input, and process the received touch input using the obtained altitude and azimuth angle information.

According to an embodiment, the electronic device 100 may calculate, from the brush stroke DB corresponding to the received touch input, a position vector and a velocity vector based on the location, size, and time information of the received touch input, obtain altitude and azimuth angle information corresponding to the position vector and the velocity vector, and process the received touch input using the obtained altitude and azimuth angle information. Specifically, the touch input may include a plurality of touch events, and the electronic device 100 may calculate a position vector and a velocity vector based on location, size, and time information of each of the touch events, determine a candidate touch event in which a difference between the calculated position vector and velocity vector and the position vector and velocity vector of touch events included in the brush stroke DB does not exceed a threshold value, and process the touch event using altitude and azimuth angle information of the determined candidate touch event.

Figure 2:
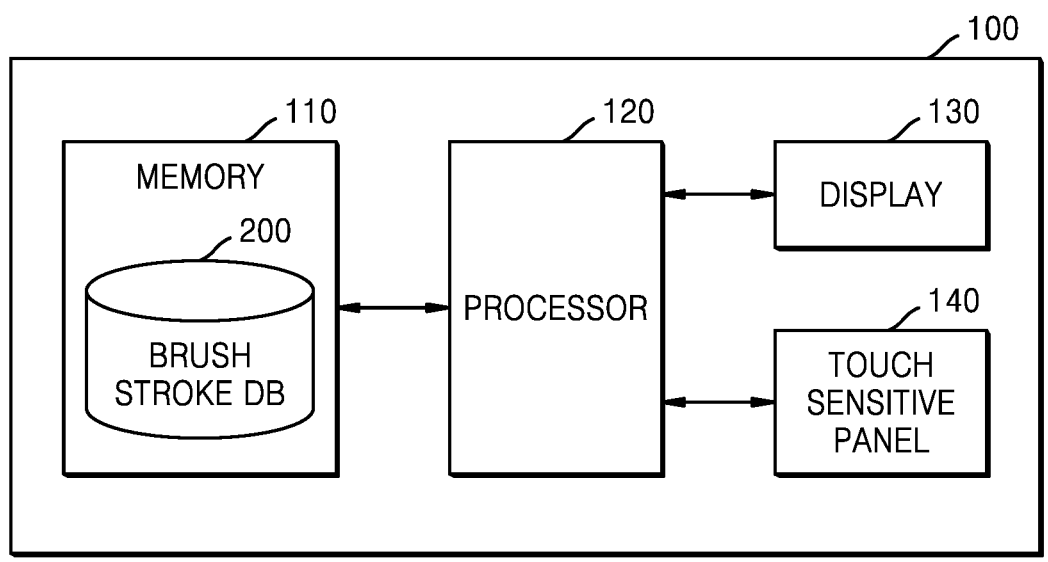
FIG. 2 is a block diagram illustrating an example configuration of an electronic device according to various embodiments.

FIG. 2 is a block diagram illustrating an example configuration of an electronic device according to various embodiments.

Referring to FIG. 2, the electronic device 100 may include a memory 110, a processor (e.g., including processing circuitry) 120, a display 130, and a touch sensitive panel 140.

The electronic device 100 may be a computing device, such as a smartphone, a laptop computer, a desktop computer, a personal digital assistant (PDA), and a tablet personal computer (PC), but is not limited thereto.

The display 130 displays a screen. For example, the display 130 may display a certain screen under the control of the processor 120. For example, when a touch input from a touch input means, such as a passive stylus, is received, the display 130 may output a result image corresponding to the received touch input.

The touch sensitive panel 140 may include a device that senses a touch input, and may sense a touch using, for example, a capacitive, resistive, ultrasonic, or infrared method. The processor 120 may obtain information about an occurrence location of the touch input and a size (or pressure) of the area of the touch input by interpreting a touch input received through the touch sensitive panel 140. The information about the occurrence location of the touch input may be obtained in the form of coordinates. A figure may be configured based on pixels that receive the touch input, and X and Y coordinates of a point representing the center of gravity of the figure may be obtained as the location information of the touch input. Depending on the type of the touch sensitive panel 140, the pressure of the touch input or the size of the area of the touch input may be measured. In the case of the resistive method, the force (pressure) of the touch input may be obtained, and in the case of the capacitive, ultrasonic, or infrared method, the size of the area of the touch input may be obtained. In the case of the pressure, a case where no touch event occurs is set to a minimum value, based on a maximum value of pressure that is recognizable by a hardware device. The pressure occurring therebetween is measured and linearly analyzed. Accordingly, a relative value of the analyzed force may be obtained as the pressure of the touch input. In the case of the size, hardware recognizes the values of the pixels receiving the touch input in the X-axis and Y-axis, and the average of the lengths of the two axes is used.

The memory 110 may store at least one instruction. In addition, the memory 110 may store at least one instruction executable by the processor. In addition, the memory 110 may store at least one program executable by the processor 120.

According to an embodiment, the memory 110 may include a brush stroke DB 200 in which the touch input is classified according to a brush stroke and information of the touch input is stored. The brush stroke DB 200 may include, for example, a first brush stroke DB and a second brush stroke DB. For example, the first brush stroke may represent an eccentric brush stroke, and the second brush stroke may represent a middle brush stroke. The eccentric brush stroke or the middle brush stroke is an example, and other brush strokes may be further included.

According to an embodiment, the memory 110 may include one or more instructions for processing the touch input so as to naturally express a trajectory according to a brush stroke using the brush stroke DB 200 even when a touch input from a passive stylus is received.

According to an embodiment, the memory 110 may include a plurality of DBs respectively corresponding to the brush strokes. Each of the DBs respectively corresponding to the brush strokes may include information about a plurality of trajectories obtained by performing touch inputs according to brush strokes using the active stylus.

According to an embodiment, pieces of trajectory information corresponding to a plurality of brush strokes may include trajectory information corresponding to a first brush stroke and trajectory information corresponding to a second brush stroke. The trajectory information corresponding to the first brush stroke may include pieces of trajectory information obtained by performing a plurality of touch inputs according to the first brush stroke. Each of the pieces of trajectory information may include information about a plurality of touch events included in the touch input representing each trajectory. The trajectory information corresponding to the second brush stroke may include pieces of trajectory information obtained by performing a plurality of touch inputs according to the second brush stroke. Each of the pieces of trajectory information may include information about a plurality of touch events included in the touch input representing each trajectory.

According to an embodiment, the information about each of the touch events may include at least one of a location, a size, a time, an altitude angle, and an azimuth angle of the touch event.

The processor 120 may include various processing circuitry and executes at least one instruction stored in the memory 110 to control an intended operation to be performed. The at least one instruction may be stored in an internal memory included in the processor 120, or may be stored in a memory 110 included in a data processing device separate from the processor.

For example, the processor 120 may execute the at least one instruction to control at least one component included in the data processing device so that an intended operation is performed. Accordingly, even when a case where the processor performs certain operations is described as an example, it may refer, for example, to the processor controlling at least one component included in the electronic device so that the certain operations are performed.

According to an embodiment, the processor 120 may execute the one or more instructions stored in the memory 110 to receive a touch input through the touch sensitive panel, to detect the change of the size of the touch input received for a preset time, to identify a brush stroke corresponding to the detected change of the size of the touch input among a plurality of brush strokes, to obtain trajectory information corresponding to the detected touch input from a DB corresponding to the identified brush stroke, to process a touch input from a pointing means according to the obtained trajectory information corresponding to the touch input, and to output a processing result on the display.

According to an embodiment, the processor 120 may execute the one or more instructions stored in the memory 110 to detect the change of the size of the touch input, based on a difference between a size of a touch event detected at a first time point and a size of a touch event detected at a second time point.

According to an embodiment, the processor 120 may execute the one or more instructions stored in the memory 110 to: when the change of the size of the touch input exceeds a specified threshold value, determine the touch input as the first brush stroke, for example, the eccentric brush stroke; and when the change of the size of the touch input does not exceed the specified threshold value, determine the touch input as the second brush stroke, for example, the middle brush stroke.

According to an embodiment, the processor 120 may execute the one or more instructions stored in the memory 110 to: based on the received touch input being identified as the first brush stroke, obtain a DB corresponding to the first brush stroke; search for a candidate touch event from the DB corresponding to the first brush stroke using a position vector and a velocity vector of each of the touch events included in the touch input; obtain altitude or azimuth angle information from information about the found candidate touch event; and process the touch input using the altitude or azimuth angle information. Specifically, a touch event in which a difference between the position vector and the velocity vector of each of the touch events included in the touch input and the position vector and the velocity vector of the touch events in the DB corresponding to the first brush stroke is less than a threshold value may be determined as the candidate touch event.

According to an embodiment, the processor 120 may execute the one or more instructions stored in the memory 110 to: based on the received touch input being identified as the first brush stroke, search the DB corresponding to the first brush stroke for a candidate touch event set corresponding to a touch event set related to the received touch input; obtain altitude or azimuth angle information from touch event information included in the candidate touch event set; and process the touch input using the altitude or azimuth angle information. According to an embodiment, the touch event set may include a touch event to be currently processed and one or more previous touch events.

According to an embodiment, the processor 120 may execute the one or more instructions stored in the memory 110 to search the DB corresponding to the first brush stroke for the corresponding candidate touch event set, based on the change of the location or the change of the size of the touch events included in the touch event set.

According to an embodiment, the processor 120 may execute the one or more instructions stored in the memory 110 to search for the candidate touch event set having a location change with a difference less than a threshold value from a change of the location of touch events included in the touch event set or having a change of the size with a difference less than a threshold value from a change of the size of touch events included in the touch event set.

According to an example, the processor 120 may be internally implemented in a form including at least one internal processor and a memory device (e.g., random access memory (RAM), read-only memory (ROM), etc.) that stores at least one of programs, instructions, signals, and data to be processed or used by the internal processor.

In addition, the processor 120 may include a graphic processing unit (GPU) for graphic processing corresponding to video. In addition, the processor may be implemented as a system on chip (SoC) in which a core and a GPU are integrated. In addition, the processor may include a multi-core over a single core. For example, the processor may include a dual core, a triple core, a quad core, a hexa core, an octa core, a deca core, a dodeca core, a hexadecimal core, and the like.

In order to implement various embodiments disclosed in the present disclosure, the electronic device 100 may include only some components illustrated in FIG. 2, or may include more components than the components illustrated in FIG. 2.

Figure 3:
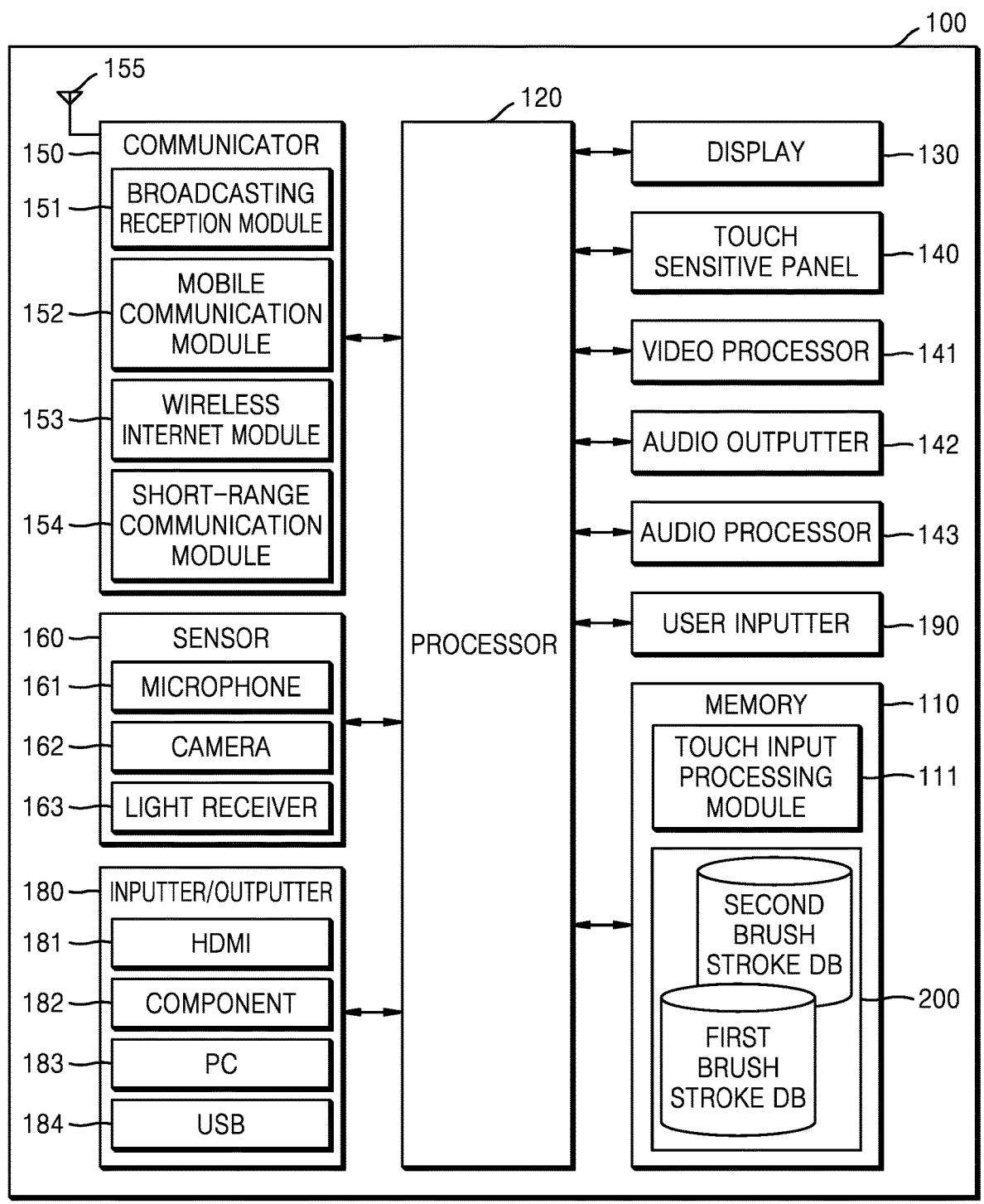
FIG. 3 is a block diagram illustrating an example configuration of an electronic device according to various embodiments.

FIG. 3 is a block diagram illustrating an example configuration of the electronic device according to various embodiments.

In FIG. 3, the same components as in FIG. 2 are denoted by the same reference numerals. Therefore, in describing the electronic device 100, the same description as provided above with reference to FIG. 2 may not be repeated.

Referring to FIG. 3, the electronic device 100 may include a memory 110, a processor (e.g., including processing circuitry) 120, a display 130, and a touch sensitive panel 140, and may further include a video processor (e.g., including video processing circuitry) 141, an audio outputter (e.g., including audio output circuitry) 142, an audio processor (e.g., including audio processing circuitry) 143, a communicator (e.g., including communication circuitry) 150, a sensor 160, a brush stroke processing module (e.g., including various processing circuitry and/or executable program instructions) 170, an inputter/outputter (e.g., including input/output circuitry) 180, and a user inputter (e.g., including user input circuitry) 190. The processor 120 may include various processing circuitry and control the components of the electronic device 100 to perform operations.

Regarding the memory 110 and the processor 120, the same description as provided above with reference to FIG. 2 may not be repeated with reference to FIG. 3.

The display 130 may display an image on a screen under the control of the processor 120. The image displayed on the screen may be received from the communicator 150, the inputter/outputter 180, and the memory 110.

The video processor 141 may include various video processing circuitry and process image data to be displayed by the display 130, and may perform various image processing operations, such as decoding, rendering, scaling, noise removal, frame rate conversion, and resolution conversion, on the image data.

The audio processor 143 may include various audio processing circuitry and processes audio data. The audio processor 143 may perform various processes, such as decoding, amplification, and noise removal, on the audio data.

The audio outputter 142 may include various audio output circuitry and output audio included in a broadcasting signal received under the control of the processor 120, audio input through the communicator 150 or the inputter/outputter 180, and audio stored in the memory 110. The audio outputter 142 may include at least one of a speaker, a headphone output terminal, or a Sony/Philips digital interface (S/PDIF) output terminal.

The communicator 150 may include various communication circuitry included in one or more modules that enable wireless communication between the electronic device 100 and a wireless communication system or between the electronic device 100 and a network in which other electronic devices are located. For example, the communicator 150 may include a broadcasting reception module 151, a mobile communication module 152, a wireless Internet module 153, and a short-range communication module 154. The communicator 150 may be referred to as a transceiver.

The broadcasting reception module 151 may include various communication circuitry that receives broadcasting signals and/or broadcasting-related information from an external broadcasting management server through a broadcasting channel. The broadcasting signals may include not only TV broadcasting signals, radio broadcasting signals, and data broadcasting signals, but also broadcasting signals in which data broadcasting signals are combined with TV broadcasting signals or radio broadcasting signals.

The mobile communication module 152 may include various communication circuitry that transmits and receives radio signals to and from at least one of a base station, an external terminal, and a server on a mobile communication network. The radio signals may include voice call signals, video call signals, or various types of data according to text/multimedia message transmission and reception.

The wireless Internet module 153 refers to a module including various communication circuitry for wireless Internet connection, and may be built into or external to a device. As wireless Internet technologies, wireless LAN (WLAN) (Wi-Fi), wireless broadband (Wibro), world interoperability for microwave access (Wimax), high speed downlink packet access (HSDPA), and the like may be used. The electronic device 100 may establish a Wi-Fi peer-to-peer (P2P) connection with other devices through the wireless Internet module 153.

The short-range communication module 154 refers to a module including various communication circuitry for short-range communication. As short-range communication technologies, Bluetooth, Radio Frequency Identification (RFID), Infrared Data Association (IrDA), Ultra Wideband (UWB), ZigBee, and the like may be used.

The sensor 160 may sense a user's voice, a user's image, or a user's interaction, and may include a microphone 161, a camera 162, and a light receiver 163. The microphone 161 receives a user's utterance. The microphone 161 may convert a received voice into an electrical signal and output the electrical signal to the processor 120. The camera 162 may receive an image (e.g., consecutive frames) corresponding to a user's motion including a gesture within a camera recognition range. The light receiver 163 receives an optical signal (including a control signal) received from a remote control device. The light receiver 163 may receive an optical signal corresponding to a user input (e.g., touch, press, touch gesture, voice, or motion) from the remote control device. The control signal may be extracted from the received optical signal under the control of the processor 120.

The inputter/outputter 180 may include various circuitry that receives video (e.g., moving picture), audio (e.g., voice, music, etc.), and additional information (e.g., electronic program guide (EPG), etc.) from the outside of the electronic device 100 under the control of processor 120. The inputter/outputter 180 may include one of a high-definition multimedia interface (HDMI) port 181, a component jack 182, a PC port 183, and a universal serial bus (USB) port 184. The inputter/outputter 180 may include a combination of the HDMI port 181, the component jack 182, the PC port 183, and the USB port 184.

The user inputter 190 may include various user input circuitry that allows the user to input data for controlling the electronic device 100. For example, the user inputter 190 may include a keypad, a dome switch, a touch pad, a jog wheel, and a jog switch, but is not limited thereto.

The memory 110 according to an embodiment may store programs for processing and control by the processor 120 and may store data input to or output from the electronic device 100. In addition, the memory 110 may store data necessary for the operations of the electronic device 100.

Furthermore, the programs stored in the memory 110 may be classified into a plurality of modules according to the functions thereof.

The memory 110 according to an embodiment may include a touch input processing module 111 and a brush stroke DB 200.

The touch input processing module 111 may include one or more instructions for processing a touch input by referring to the brush stroke DB 200 according to embodiments disclosed in the present disclosure.

The brush stroke DB 200 may include DBs respectively corresponding to a plurality of brush strokes. For example, the brush stroke DB 200 may include a first brush stroke DB and a second brush stroke DB.

The processor 120 may include various processing circuitry and controls overall operations of the electronic device 100, controls signal flow between internal components of the electronic device 100, and processes data. When there is a user's input or when a preset stored condition is satisfied, the processor 120 may execute an operating system (OS) and various applications stored in the memory 110.

In addition, the processor 120 may include an internal memory. In this case, at least one of the data, the programs, and the instructions stored in the memory 110 may be stored in the internal memory (not illustrated) of the processor 120.

On the other hand, the block diagrams of the electronic device 100 illustrated in FIGS. 2 and 3 are block diagrams of a non-limiting example. The components of the block diagrams may be integrated, added, or omitted according to the disclosure of the electronic device 100 actually implemented. For example, when necessary, two or more components may be integrated into one component, or one component may be subdivided into two or more components. Additionally, the function performed by each block is for describing various embodiments and the specific operation or device thereof does not limit the scope of the present disclosure.

Figure 4:
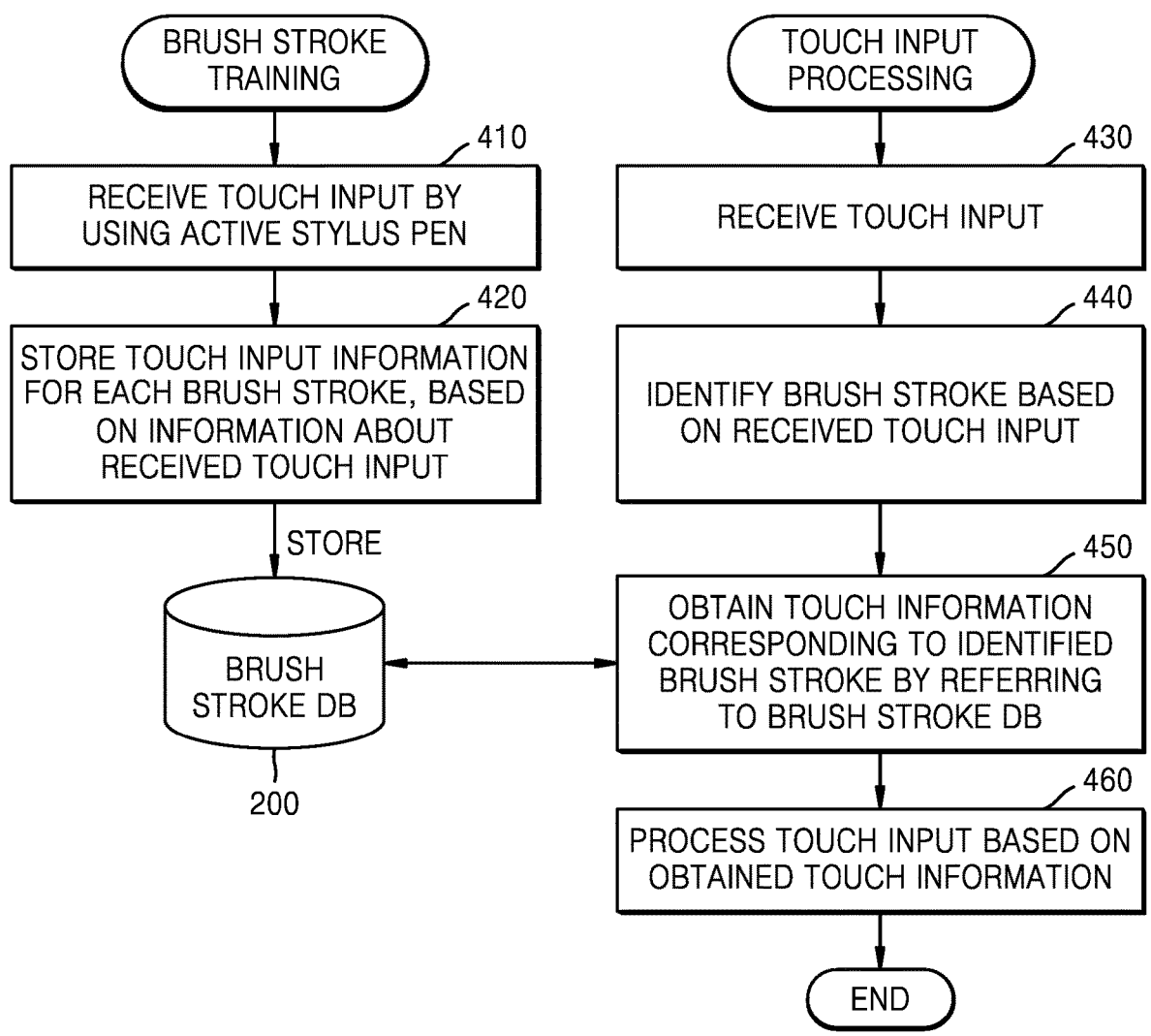
FIG. 4 is a flowchart illustrating an example method of generating a brush stroke database and processing a touch input using the generated brush stroke database, according to various embodiments.

FIG. 4 is a flowchart illustrating an example method of generating a brush stroke DB and processing a touch input using the generated brush stroke DB, according to various embodiments.

Referring to FIG. 4, in operation 410, the electronic device 100 may receive a touch input using an active stylus pen. In order to better express a unique touch input effect according to a brush stroke, it may be preferable to apply the touch input to the electronic device 100 using an active stylus brush having brush bristles provided at an end of a brush handle. The active stylus brush may be manufactured for the purpose of generating the brush stroke DB.

In operation 420, the electronic device 100 may generate the brush stroke DB 200 by storing touch input information for each brush stroke, based on information obtained according to the received touch input. The brush stroke DB 200 may include a separate DB for each brush stroke according to one or more brush strokes. The brush stroke may include, for example, a middle brush stroke or an eccentric brush stroke.

The DB for each brush stroke may include, for example, the location of the touch input, the size of the touch input, the time at which the touch input is performed, information about the azimuth angle and the altitude angle of the active stylus pen when the touch input is performed, and the like, as information of the received touch input according to each brush stroke. For example, the touch input may include a plurality of touch events, and the DB corresponding to each brush stroke may include an occurrence location of each touch event of the touch input, a size of the area of the touch event, an occurrence time of the touch input, a position vector, a velocity vector, altitude angle information, azimuth angle information, and the like.

The generated brush stroke DB 200 may be installed on the electronic device 100 when the electronic device 100 is manufactured, or the electronic device 100 may access a server, download the brush stroke DB 200, and store the downloaded brush stroke DB 200.

In the electronic device 100 including the brush stroke DB 200, even when the touch input is performed using the passive stylus, the effect of the touch input according to the brush stroke may be naturally and accurately expressed using the altitude and azimuth angle information stored in the brush stroke DB 200.

In operation 430, the electronic device 100 may receive a touch input from a passive stylus pen. The passive stylus pen may include a device or means having no or limited information processing capability, such as a user's finger, a traditional pen, or a traditional brush.

In operation 440, the electronic device 100 may identify a brush stroke based on the received touch input.

For example, the electronic device 100 may identify the brush stroke as a first brush stroke or a second brush stroke according to whether the change of the size of the touch input exceeds a threshold value for a specified time. For example, the electronic device 100 may identify the brush stroke as an eccentric brush stroke when the change of the size of the touch input exceeds the threshold value for the specified time, and may identify the brush stroke as a middle brush stroke when the change of the size of the touch input does not exceed the threshold value for the specified time.

In operation 450, the electronic device 100 may obtain touch input information corresponding to the identified brush stroke by referring to the brush stroke DB 200. For example, when it is identified in operation 440 that the touch input is the eccentric brush stroke, the electronic device 100 may obtain information corresponding to the received touch input by searching an eccentric brush stroke DB, and when it is identified that the touch input is the middle brush stroke, the electronic device 100 may obtain information corresponding to the received touch input by searching a middle brush stroke DB. The information corresponding to the touch input may include altitude or azimuth angle information.

In operation 460, the electronic device 100 may process the touch input based on the obtained information corresponding to the touch input. In detail, the electronic device 100 may implement an output image to be displayed in correspondence with the touch input using the obtained altitude or azimuth angle information corresponding to the touch input.

Hereinafter, an example method of generating a brush stroke DB will be described in greater detail with reference to FIGS. 5, 6, 7, 8A, 8B and 9 by way of example.

Figure 5:
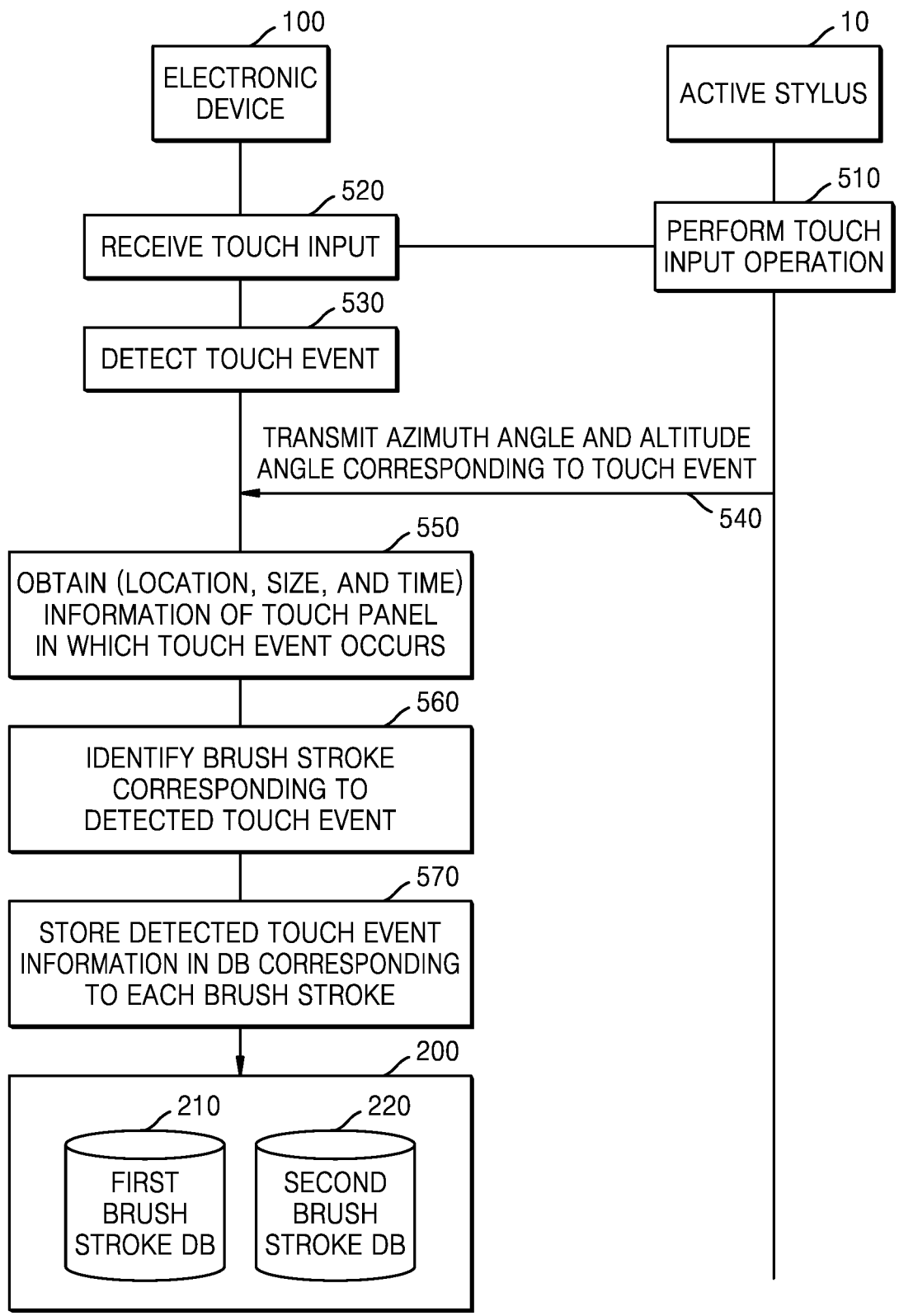
FIG. 5 is a signal flow diagram illustrating an example method of generating a brush stroke database in an electronic device, according to various embodiments.

FIG. 5 is a signal flow diagram illustrating an example method of generating a brush stroke DB in the electronic device 100, according to various embodiments.

Referring to FIG. 5, when the active stylus performs a touch input operation on the electronic device 100 in operation 510, the electronic device 100 may receive a touch input in operation 520. For example, a user or a manufacturer may cause the electronic device 100 to receive a touch input by moving the active stylus while touching the touch sensitive panel of the electronic device 100.

In operation 530, the electronic device 100 may detect a touch event by receiving the touch input.

Figure 6:
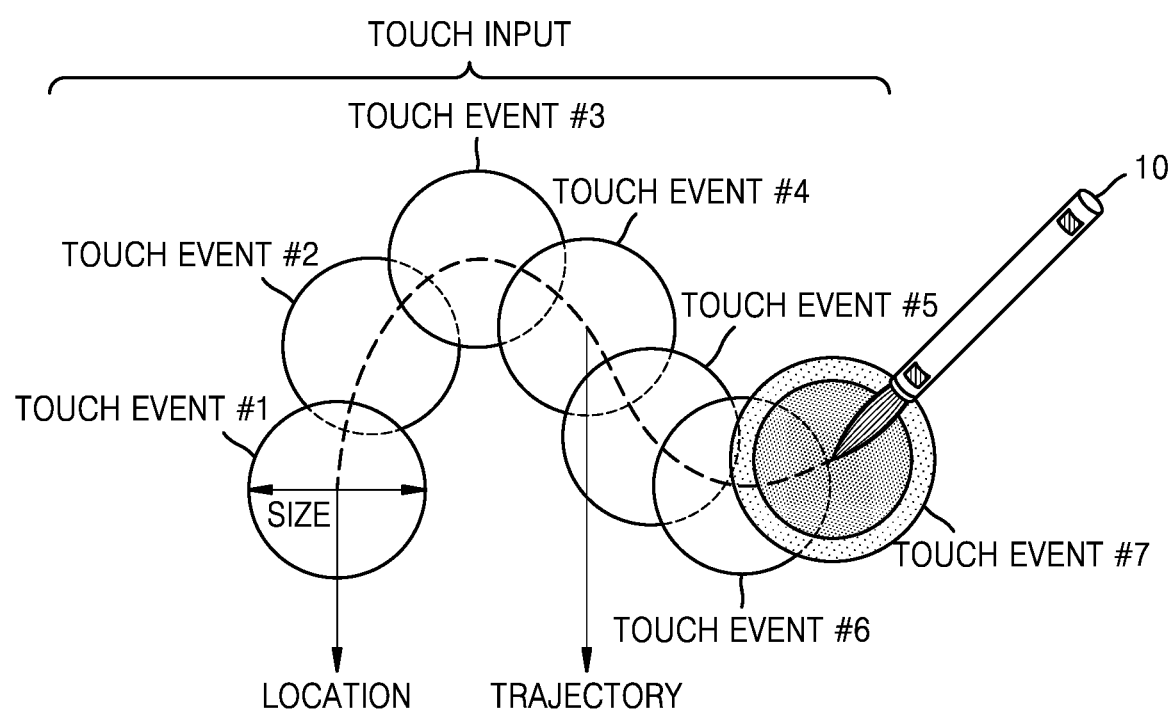
FIG. 6 is a diagram illustrasting\ a touch event according to an example.

FIG. 6 is a diagram illustrating an example touch event according to an example.

When the electronic device 100 receives the touch input, the basic unit for processing the touch input may be referred to as the touch event. For example, when the electronic device 100 receives the touch input for one second, the number of touch events included in the touch input received for one second may be tens or hundreds. For example, referring to FIG. 6, touch events #1 to #7 detected from touch input received for a specified time are illustrated.

When the touch event is detected, the electronic device 100 may obtain information about the detected touch event. The information about the touch event may include a location of the touch event, a size of the touch event, and an occurrence time of the touch event. Regarding the location of the touch event, a location corresponding to the center of gravity of a figure including pixels where the touch is detected by the touch event may be represented by X and Y coordinates. The size of the touch event may indicate the size of the figure including the pixels where the touch is detected by the touch event. The touch input occurrence time may indicate a time measured by a timer of the electronic device 100 when the touch event is detected. A trajectory may refer to a set of locations of the touch events detected for the specified time.

In operation 540, the active stylus 10 may measure an azimuth angle and an altitude angle according to the touch input operation and may transmit, to the electronic device 100, information about the measured azimuth angle and the measured altitude angle.

Figure 7:
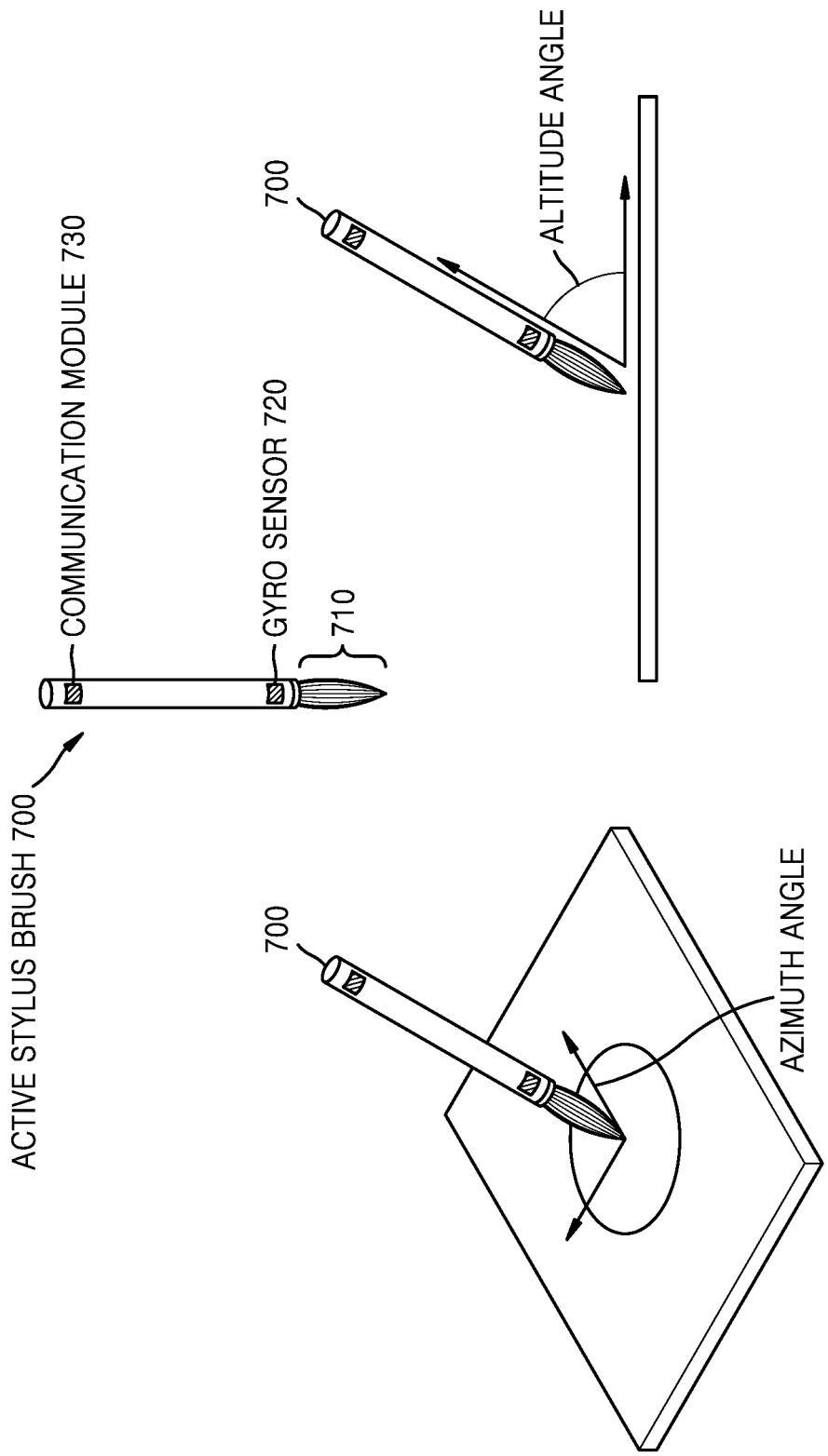
FIG. 7 is a diagram illustrating an azimuth angle and an altitude angle according to an example.

FIG. 7 is a diagram illustrating examples of the azimuth angle and the altitude angle according to an example.

Referring to FIG. 7, the active stylus may include an active stylus brush 700 to which brush bristles 710 are attached at one end of the active stylus. The active stylus brush 700 may include a gyro sensor 720 and a communication module (e.g., including communication circuitry) 730. Of course, for information processing, the active stylus brush 700 may further include a processor and a memory, which are not illustrated in FIG. 7.

The gyro sensor 720 may measure the azimuth angle or the altitude angle of the active stylus brush 700 according to the movement of the active stylus brush 700. The azimuth angle is an angle measured in spherical coordinates, and represents an angle formed with a reference vector on a reference plane when a vector from an observer at the origin to an object is projected vertically to the reference plane. The azimuth angle may have a range from 0 degrees to 360 degrees. The altitude angle represents the angular height of the sun in the sky, which is measured from the horizon, and may have a range from 0 degrees to 90 degrees.

The active stylus brush 700 may transmit information about an altitude angle and an azimuth angle, which are measured by the gyro sensor 720, to the electronic device 100 through the communication module 730.

In operation 550, the electronic device 100 may obtain touch event information from the touch sensitive panel in which the touch event occurs. The touch event information may include a location of the touch event, a size of the touch event, an occurrence time of the touch event, and the like.

In operation 560, the electronic device 100 may identify a brush stroke corresponding to the detected touch event. According to an embodiment, when the touch input is performed, the brush stroke corresponding to the touch input may be labeled. For example, in the case of the touch input according to the middle brush stroke among the brush strokes, identification information indicating the middle brush stroke is input and the touch input according to the middle brush stroke is then performed, and in the case of the touch input according to the eccentric brush stroke, identification information indicating the eccentric brush stroke is input and the touch input according to the eccentric brush stroke is then performed. In this manner, the brush stroke corresponding to each touch input may be labeled. Because one touch input corresponds to one brush stroke, a plurality of touch events included in one touch input may all be labeled with the same brush stroke.

In operation 570, the electronic device 100 may store the detected touch event information in the DB 200 corresponding to each brush stroke. For example, the electronic device 100 may generate a first brush stroke DB 210 corresponding to a first brush stroke and a second brush stroke DB 220 corresponding to a second brush stroke. When the touch input is performed with two brush strokes, that is, the middle brush stroke and the eccentric brush stroke, the electronic device 100 may generate a middle brush stroke DB and an eccentric brush stroke DB.

FIG. 8A is a diagram illustrating an example of configuring the middle brush stroke DB according to various embodiments.

Referring to FIG. 8A, the user or the manufacturer may configure the middle brush stroke DB by performing the touch input corresponding to various trajectories according to the middle brush stroke on the touch sensitive panel of the electronic device 100 using the active stylus. For example, the electronic device 100 may receive a touch input according to a first trajectory, . . . , a touch input according to an $N^{th}$ trajectory, . . . , and a touch input according to an $M^{th}$ trajectory, and may store information corresponding to the touch inputs according to the trajectories in the middle brush stroke DB. For example, when the touch input according to the $N^{th}$ trajectory includes, for example, six touch events, the middle brush stroke DB may include pieces of information about touch events #1 to #6 as information about the touch input according to the $N^{th}$ trajectory.

According to an embodiment, information about the touch events may include at least one of an occurrence location of the touch event, a size of the area of the touch event, an occurrence time of the touch event, a position vector, a velocity vector, an altitude angle, and an azimuth angle. As described above, the location, size, and time information of the touch event may be obtained using values detected from the touch sensitive panel of the electronic device 100. The altitude and azimuth angle information of the touch event may be received from the active stylus 10.

Although the configuration of the middle brush stroke DB has been described above with reference to FIG. 8A, the user or the manufacturer may also configure the eccentric brush stroke DB by performing the touch input corresponding to various trajectories according to the eccentric brush stroke on the touch sensitive panel of the electronic device 100 using the active stylus.

FIG. 8B is a diagram illustrating an example configuration of a brush stroke DB according to various embodiments.

Referring to FIG. 8B, the brush stroke DB 800 according to an example may include a touch ID 805, a touch event ID 810, a location 815, a size 820, an occurrence time 825, a position vector 830, a velocity vector 835, an altitude angle 840, an azimuth angle 845, a touch type 850, and a brush stroke type 855.

The touch ID 805 is an identifier indicating one touch input, and a plurality of touch events included in one touch input may all have the same touch ID. One touch input may indicate one trajectory from touch-down where the touch is initiated, through a move where the touch is continued, to touch-up where the stylus is lifted so as to end the touch.

Referring to FIG. 8B, the touch ID 805 includes, for example, a touch ID 1001 corresponding to a first touch input, a touch ID 1002 corresponding to a second touch input, a touch ID 2001 corresponding to a third touch input, and a touch ID 2002 corresponding to a fourth touch input.

The touch event ID 810 may include an identifier for indicating each touch event included in the touch input, and may be assigned a serial number. For example, referring to FIG. 8B, there are four touch events corresponding to each touch input.

The location 815 refers to information indicating a point at which the touch event touches the touch sensitive panel. For example, the location 815 may be represented as coordinates where the touch event occurred at a virtual graphic point, and may be expressed as a pixel value or a normalized value.

Figure 8:
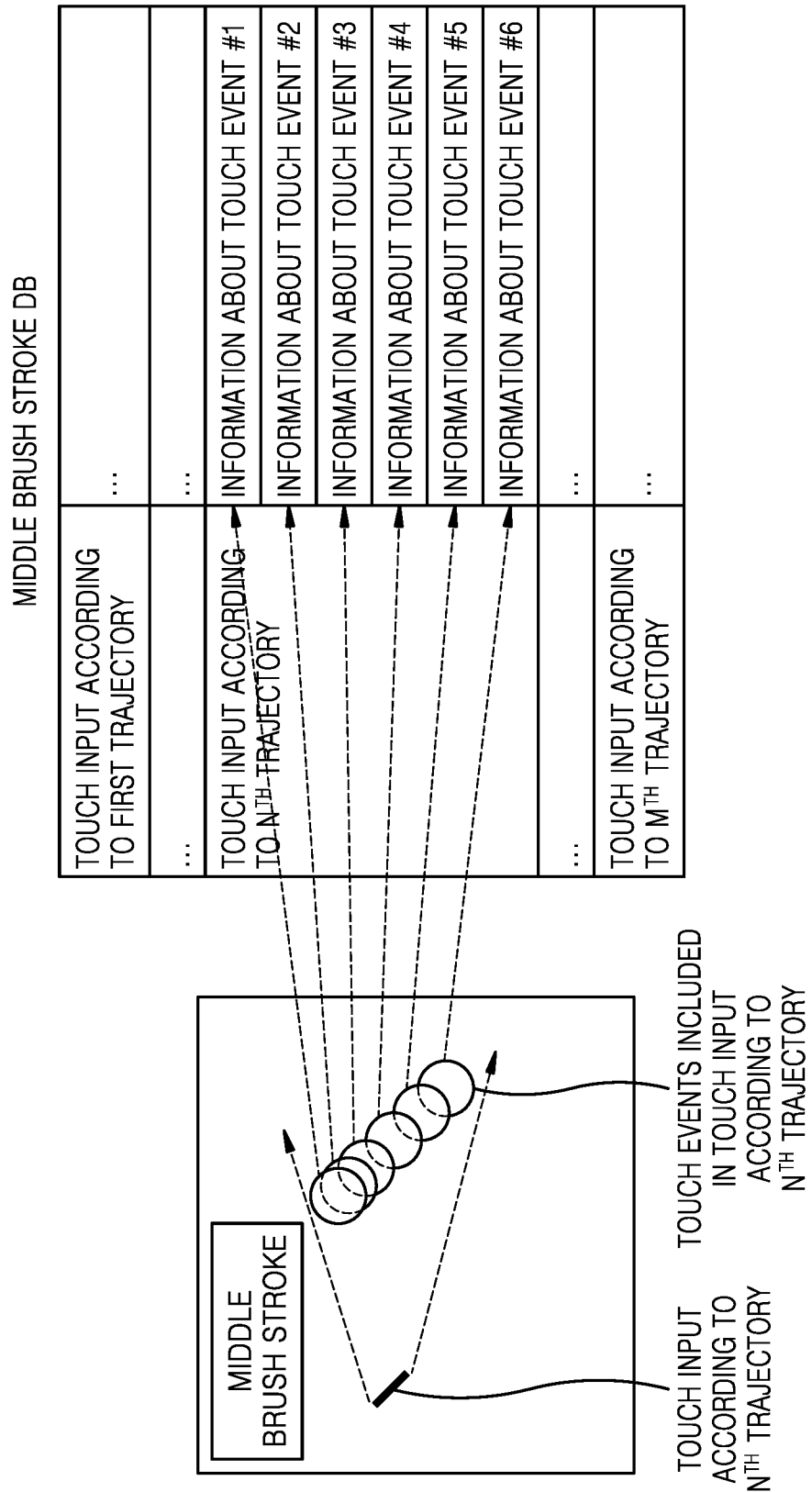
FIG. 8A is a diagram illustrating an example of configuring a middle brush stroke database according to various embodiments.
FIG. 8B is a diagram illustrating an example configuration of a brush stroke database according to various embodiments.

The size 820 may represent the occurrence area of the touch event as a value normalized by the system. For example, when a case where no touch event has occurred is 0 and the maximum area that may be detected by the touch event is 1, the area generated by the touch event may be expressed by normalizing a value between 0 and 1. In FIG. 8, the size 820 is represented as a normalized value between 0 and 1.

The occurrence time 825 may be a value obtained by measuring the occurrence time of the touch event using the timer of the electronic device 100, etc. For example, the occurrence time 825 may be represented in a time stamp format, such as yyyy-MM-dd'T'HH:mm:ss*SSSSZZZZ.

The position vector 830 may indicate a position vector based on an origin, that is, a first touch event of a touch input, and the corresponding touch event. For example, the first touch event of the touch input with the touch ID 1001 may be touch event ID 1. The position vector of the touch event in which the touch event ID of the touch ID 1001 is 2 may be calculated based on location information of the touch event with the touch event ID 1 and location information of the touch event with the touch event ID 2.

The velocity vector 835 may indicate a velocity vector based on an origin, that is, a first touch event of a touch input, and the corresponding touch event. The velocity vector of the touch event in which the touch event ID of the touch ID 1001 is 2 may be calculated based on location information and occurrence time information of the touch event with the touch event ID 1 and location information and occurrence time information of the touch event with the touch event ID 2.

The altitude angle 840 indicates the angular height of the sun in the sky, which is measured from the horizon. The altitude angle 840 may represent a value between 0 degrees and 90 degrees.

The azimuth angle 845 may refer to an angle measured in spherical coordinates, and represents an angle formed with a reference vector on a reference plane when a vector from an observer at the origin to an object is projected vertically to the reference plane. The azimuth angle 845 may represent a value between 0 degrees and 360 degrees.

The touch type 850 indicates in which operation of the touch input the corresponding touch event is located. For example, "down" indicates the first generated touch event, "move" represents a touch event in which a touch continues after the first occurrence of the touch event, and "up" indicates a touch event in which the touch input ends.

The brush stroke type 855 may indicate the type of brush stroke used for the corresponding touch input.

Hereinafter, a method of processing a touch input from a passive stylus using a brush stroke DB in the electronic device 100 will be described in greater detail with reference to FIGS. 9 to 13.

Figure 9:
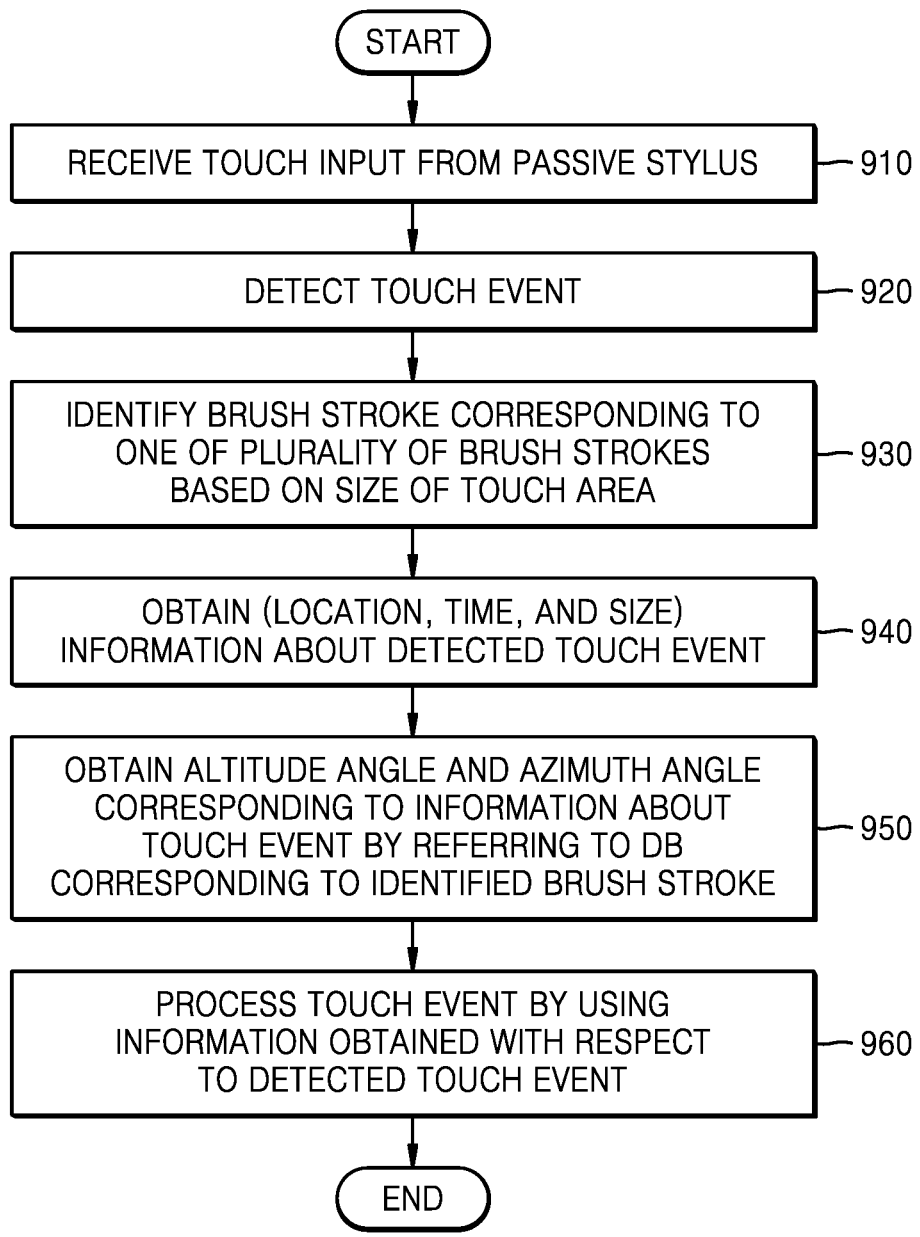
FIG. 9 is a flowchart illustrating an example method of processing a touch input received from a passive stylus using a brush stroke database in the electronic device, according to various embodiments.

FIG. 9 is a flowchart illustrating an example method of processing a touch input received from a passive stylus using a brush stroke DB in the electronic device 100, according to various embodiments.

Referring to FIG. 9, in operation 910, the electronic device 100 may receive the touch input from the passive stylus.

In operation 920, the electronic device 100 may detect a touch event by receiving the touch input.

In operation 930, the electronic device 100 may identify a brush stroke corresponding to one of a plurality of brush strokes based on the size of the touch area according to the touch event.

According to an embodiment, the electronic device 100 may identify the corresponding brush stroke using the change of the size of the touch area, based on touch events detected for a preset time.

In operation 940, the electronic device 100 may obtain information about the detected touch event. As the information about the touch event, information about the size of the touch area that touches the touch sensitive panel, the location of the touch, and the touch occurrence time may be obtained according to the touch event.

In operation 950, the electronic device 100 may search for (e.g., obtain) an altitude angle and an azimuth angle corresponding to the information about the detected touch event from a DB corresponding to the identified brush stroke.

The DB corresponding to the brush stroke may include information about a plurality of touch events, as described above with reference to FIG. 8. The information about the touch event may include, for example, location, size, occurrence time, position vector, velocity vector, altitude angle, and azimuth angle information of the touch according to the touch event. The electronic device 100 searches for, from the determined brush stroke DB, touch event information corresponding to or similar to the touch event of the touch input received from the current passive stylus, and may extract altitude and azimuth angle information from the found touch event information. For example, the electronic device 100 may calculate the position vector and the velocity vector using the location, time, and size information of the received touch event, and may search for a corresponding candidate touch event from the brush stroke DB using the calculated position vector and the calculated velocity vector. Alternatively, the electronic device 100 may search for the candidate touch event by directly using the location, time, and size information of the received touch event.

In operation 960, the electronic device 100 may process the touch event using the altitude and azimuth angle information obtained with respect to the detected touch event. In detail, the electronic device 100 may generate a touch image to be output in response to the touch event using the altitude and azimuth angle information obtained with respect to the detected touch event, and may control the generated touch image to be output on the display.

Figure 10:
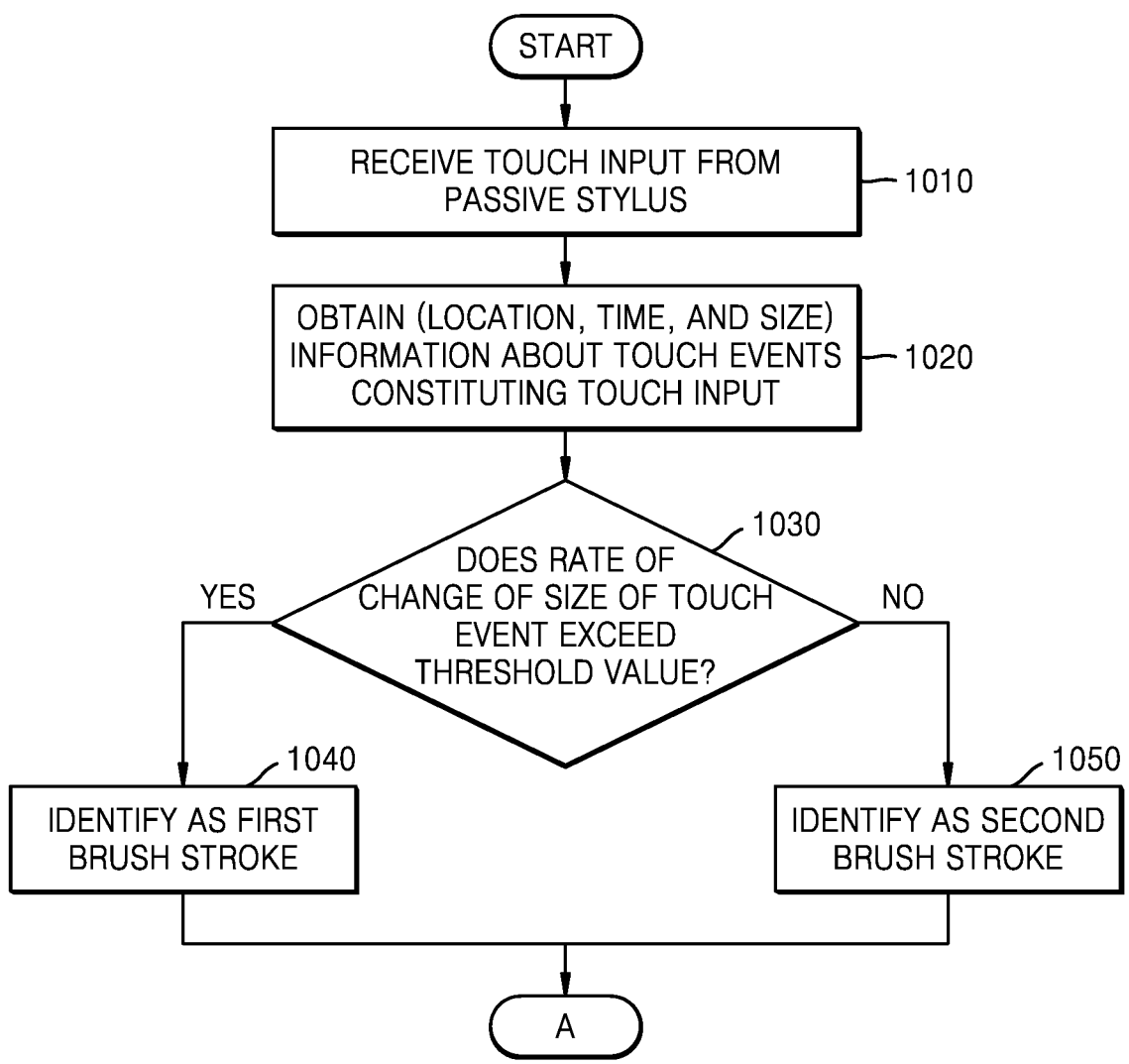
FIG. 10 is a flowchart illustrating an example process of identifying a brush stroke based on a touch input in the electronic device, according to various embodiments.

FIG. 10 is a flowchart illustrating an example process of identifying a brush stroke based on a touch input in the electronic device 100, according to various embodiments.

Referring to FIG. 10, in operation 1010, the electronic device 100 may receive a touch input from a passive stylus.

In operation 1020, the electronic device 100 may detect one or more touch events of the received touch input, and may obtain information about the detected touch event.

According to an embodiment, the electronic device 100 may obtain pieces of information about a plurality of touch events detected from a time point at which an initial touch event is detected according to a touch input to a preset time. This is because it is necessary to analyze a change in touch events included in a touch input for a specified time in order to determine the received touch input.

According to an embodiment, the electronic device 100 may obtain the size, the location, and the occurrence time of the touch according to the touch event as information about the touch event.

In operation 1030, the electronic device 100 may determine whether the rate of the change of the size of the touch event exceeds a threshold value for a preset time. The rate of the change of the size of the touch event for the preset time may indicate a ratio between the size of the touch area according to the first touch event and the size of the touch area according to the last touch event within a preset (e.g., specified) time interval.

In operation 1040, the electronic device 100 may identify a brush stroke as a first brush stroke when the rate of change of the size of the touch event exceeds the threshold value for the preset time interval.

In operation 1050, the electronic device 100 may identify a brush stroke as a second brush stroke when the rate of the change of the size of the touch event does not exceed the threshold value for the preset time interval. After identifying the first brush stroke and the second brush stroke, the process may proceed to operation A.

Figure 11:
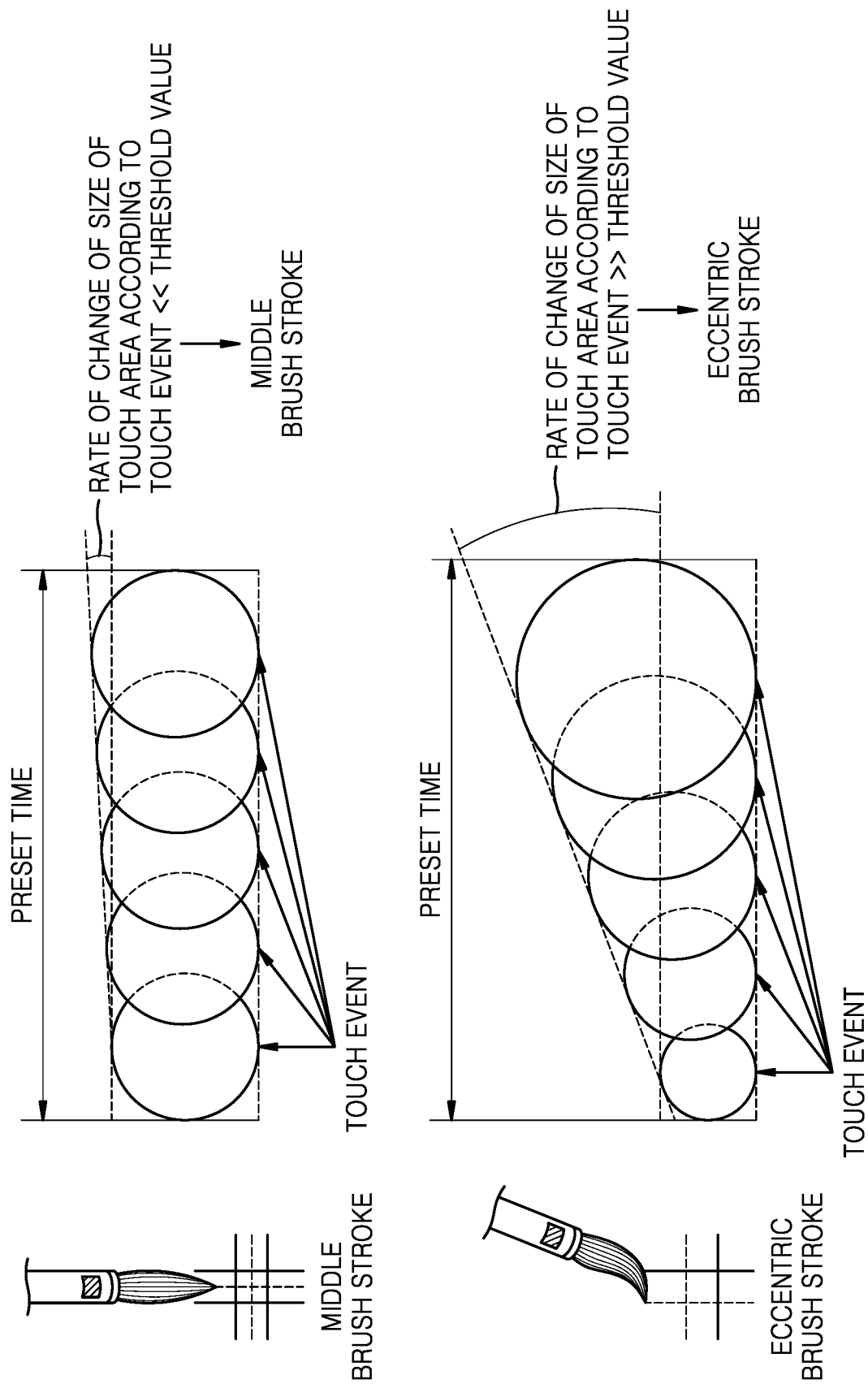
FIG. 11 is a diagram illustrating a rate of change of the size of a touch event in an eccentric brush stroke and a middle brush stroke, according to various embodiments.

FIG. 11 is a diagram illustrating an example rate of the change of the size of a touch event in an eccentric brush stroke and a middle brush stroke, according to various embodiments.

Referring to FIG. 11, the middle brush stroke represents a brush stroke in which a brush tip passes through the middle of stroke. In the case of the middle brush stroke, a change of a touch area according to the touch input is not great. On the other hand, the eccentric brush stroke represents a brush stroke in which a brush tip passes through one side of stroke. In the case of the eccentric brush stroke, a change of a touch area according to the touch input is great at the beginning of the touch input. Accordingly, the electronic device 100 may set a threshold value for distinguishing between the eccentric brush stroke and the middle brush stroke according to an embodiment. When the rate of the change of the size of the touch area according to the touch event for a preset time exceeds the threshold value, the electronic device 100 may identify the brush stroke as the eccentric brush stroke, and when the rate of the change of the size of the touch area according to the touch event for a preset time does not exceed the threshold value, the electronic device 100 may identify the brush stroke as the middle brush stroke.

For example, in the case of the middle brush stroke, the brush is erected at a right angle so that the brush tip is in the middle of the stroke drawn by the brush. In the case of the middle brush stroke, the drawing direction of the stroke coincides with the brush stroke. That is, on the side of the touch sensor, a relatively constant pressure or size is maintained over time in a direction in which the trajectory of the touch input is generated. Therefore, the touch input may be designated as the middle brush stroke, and the altitude angle and the azimuth angle may be obtained by referring to the middle brush stroke DB until the trajectory ends. In the case of the middle brush stroke, the azimuth angle is determined by the drawing direction of the trajectory, and the altitude angle shows a relatively high value due to the characteristic of erecting the brush at a right angle.

The electronic device 100 may set a first touch input time as T0 and observe a pattern of touch events in inputs incoming for n seconds thereafter. Because the number of touch events incoming for n seconds is different for each situation, all touch event values measured up to T1 are stored and observed. For example, in a case where the touch according to the touch event does not change at an initially input position even after a specified time has elapsed, or in a case where the touch change of the sizes within a specific threshold value when an average change is measured with respect to an initially input size, the electronic device 100 may recognize this case as a middle brush stroke trajectory. For example, assuming that the force or size of the normalized input ranges from 0 to 100, when the first input is 50 and the change of the force or size incoming for one second thereafter is within 25 to 75, that is, when the rate of change of the size is between +50% and −50%, this may be recognized as the middle brush stroke. Alternatively, even when the size value of the touch sufficiently changes between T0 and T1 but the brush stroke is not identified as the eccentric brush stroke, this may be identified as the middle brush stroke. The classification of these brush strokes is valid until the trajectory ends.

In the case of the eccentric brush stroke, the brush is inclined and the tip of the brush passes through one side of the stroke. For example, the tip of the brush is at one end of the drawn stroke. To this end, the altitude angle of the brush is lowered, and the azimuth angle of the brush indicates the direction pointing to the tip of the brush. Therefore, in the case of the eccentric brush stroke, the input incoming through the passive stylus shows a characteristic pattern. First, from the moment the first touch-down event occurs, the force or size rapidly increases. For example, a case where the force or size of the touch according to the touch event increases by 100% or more for a preset time may be defined as the eccentric brush stroke. For example, when the range of the force or size of the normalized input is 0 to 100 and the first input is 25, the size of the input incoming within one second may increase to 50 or more. When this is continuously maintained, the trajectory may be identified as the eccentric brush stroke. After the corresponding trajectory is determined as the trajectory by the eccentric brush stroke, altitude and azimuth angle information may be obtained by referring to the eccentric brush stroke DB.

Figure 12:
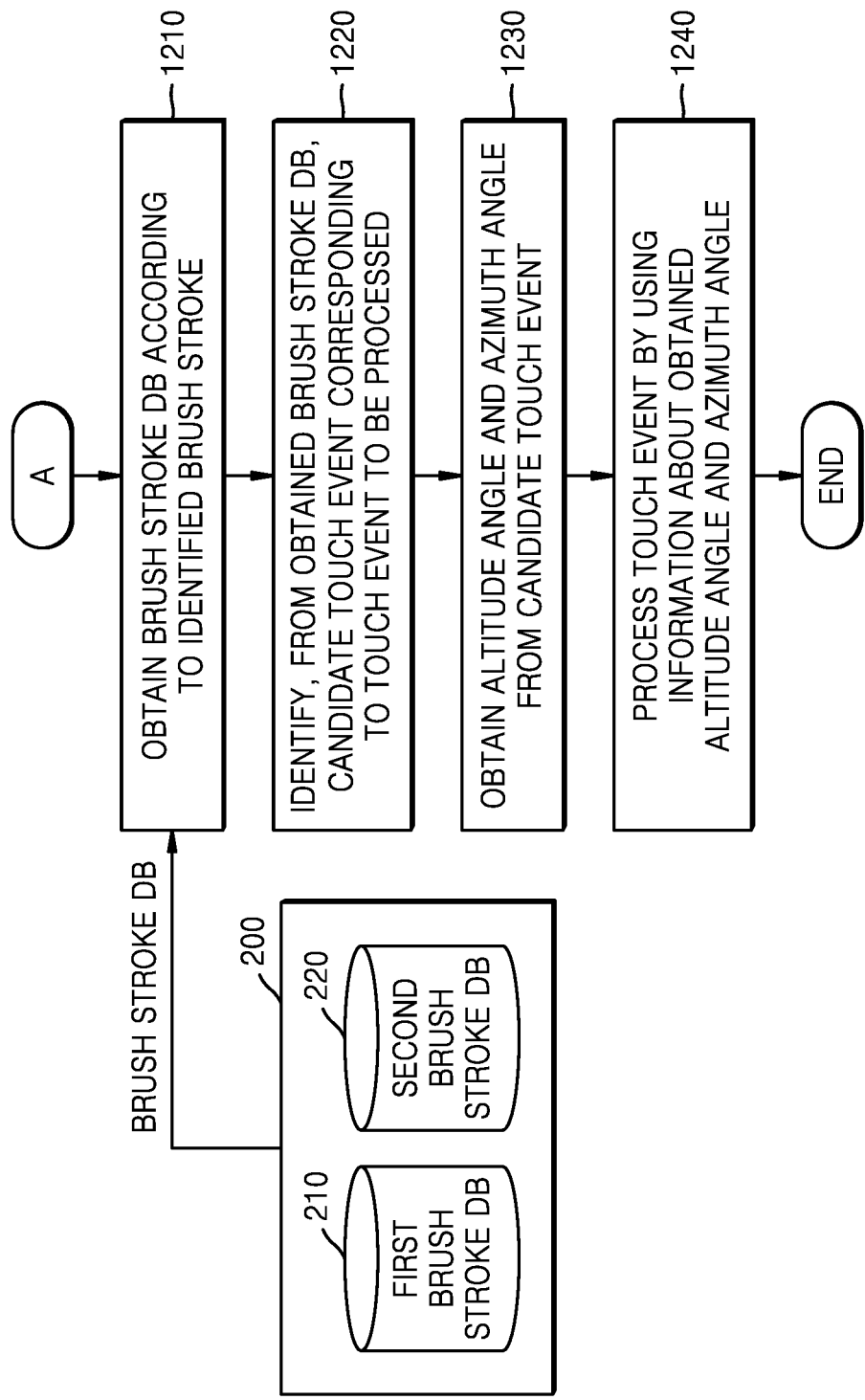
FIG. 12 is a flowchart illustrating an example method of processing a touch event according to a brush stroke in the electronic device, according to various embodiments.

FIG. 12 is a flowchart illustrating an example method of processing a touch event according to a brush stroke in the electronic device 100, according to various embodiments.

Referring to FIG. 12, in operation 1210, the electronic device 100 may search each corresponding brush stroke DB according to the identified brush stroke.

According to an embodiment, the electronic device 100 may identify (e.g., obtain) a brush stroke from initial information of a touch input according to the operation illustrated in FIG. 10. In the case of a first brush stroke, the electronic device 100 may search a first brush stroke DB 210, and in the case of a second brush stroke, the electronic device 100 may search a second brush stroke DB 220.

In operation 1220, the electronic device 100 may identify, from the obtained brush stroke DB, a candidate touch event corresponding to the touch event to be processed.

According to an embodiment, the electronic device 100 may search for the candidate touch event from the obtained brush stroke DB using a position vector and a velocity vector of the touch event to be processed. For example, the electronic device 100 may determine, as the candidate touch event, a touch event in which the difference between the position vector and velocity vector of the touch event to be processed and the position vector 830 and velocity vector 835 of the touch events included in the obtained brush stroke DB is less than a threshold value. When the electronic device 100 does not find the touch event less than the threshold value, the electronic device 100 may adjust the threshold value and search for a touch event less than the adjusted threshold value again.

In operation 1230, the electronic device 100 may obtain an altitude angle and an azimuth angle from the identified candidate touch event.

In operation 1240, the electronic device 100 may process the touch event using information about the obtained altitude angle and azimuth angle.

In the example illustrated in FIG. 12, the position vector and the velocity vector are used to search for the candidate touch event from the brush stroke DB, but the location, time, and size information of the touch event included in the brush stroke DB may also be used. In order to process the touch event by reflecting the characteristics of the brush stroke, the electronic device 100 may find a similar trajectory by taking into account not only the current touch event but also one or more previous touch events, and may obtain azimuth and altitude angle information of the touch event on the found similar trajectory. Accordingly, the electronic device 100 may search for the brush stroke DB in units of touch event sets including information about the current touch event and information about one or more previous touch events. For example, when the electronic device 100 targets information about the current touch event and information about three previous touch events, a total of four touch events are included. Therefore, the electronic device 100 may search for a candidate touch event set including four consecutively arranged touch events in the brush stroke DB.

Figure 13:
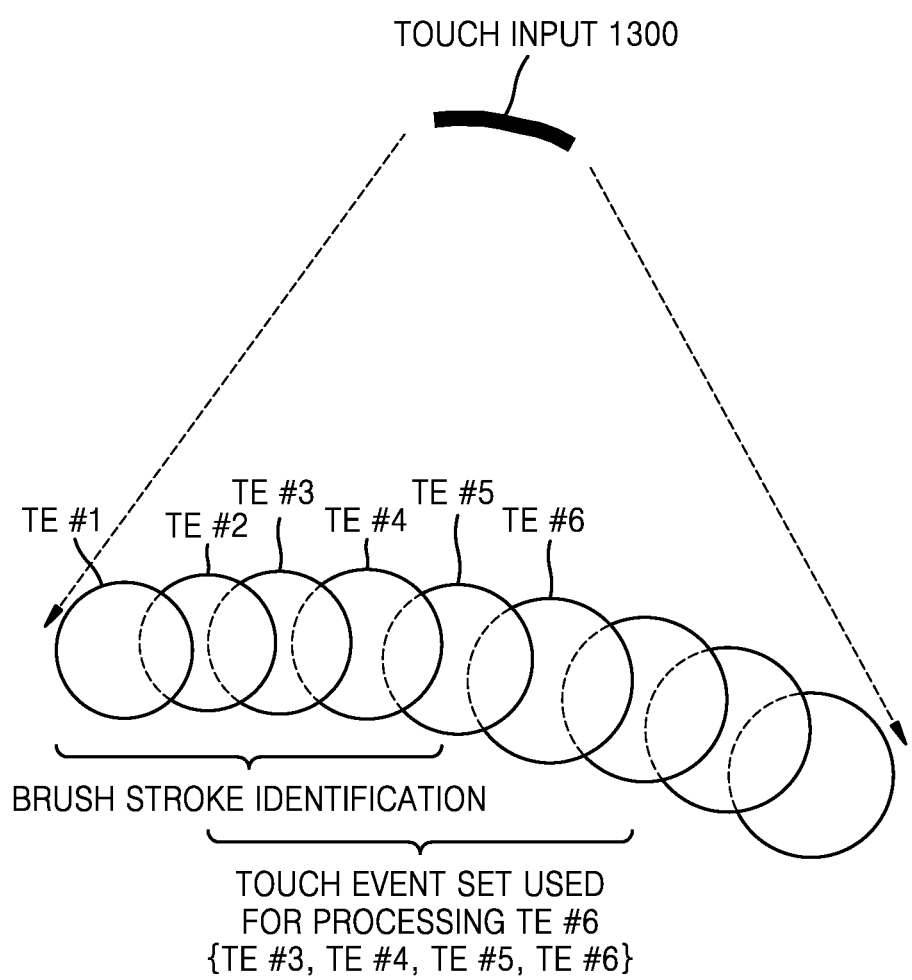
FIG. 13 is a diagram illustrating a touch event set according to various embodiments.

FIG. 13 is a diagram illustrating an example touch event set according to various embodiments.

Referring to FIG. 13, when a touch input 1300 is received, the electronic device 100 may identify the brush stroke of the touch input based on touch events, for example, TE #1, TE #2, TE #3, and TE #4, which are detected for a preset time among a plurality of touch events of the touch input 1300.

As described above, when the brush stroke of the touch input 1300 is identified, touch events included in the touch input 1300 may be processed by referring to the determined brush stroke DB for the touch input 1300 until the trajectory of the touch input 1300 ends. For example, when touch event TE #6 is processed, the electronic device 100 may perform appropriate processing on touch event TE #6 by identifying trajectories of not only touch event TE #6 to be currently processed but also one or more touch events prior to touch even TE #6. For example, in order to process touch event TE #6, the electronic device 100 may search the DB for a candidate touch event set showing a trajectory similar to a touch event set including not only touch event TE #6 but also three touch events, that is, TE #3, TE #4, and TE #5, prior to touch event #6.

According to an embodiment, the electronic device 100 may determine whether there is a candidate touch event set in which a relative position change is less than or equal to a threshold value. The electronic device 100 may use the concept of the relative position to search for trajectories having the same position change, that is, the candidate touch event set, even when the absolute position of the touch sensitive panel is different. Even when the touch event to be currently processed by the electronic device 100 occurred at position A of the touch sensitive panel and the candidate touch event stored in the DB occurred at position B, when the position change patterns therebetween are the same as each other, the electronic device 100 may search for a touch event related to position B as the candidate touch. For example, when the initial position is (100, 100) on the x and y coordinates and the position obtained later is (101, 101), it may be stated that the positions increase by 1 in x-axis and the y-axis, respectively. Therefore, it may be determined that it has the same position change as the trajectory changed from the initial position (200, 200) to (201, 201). The electronic device 100 may search whether there is a candidate touch event set having a position change similar to that of the touch event set to be processed based on the state position change. That is, the electronic device 100 may search whether there is a candidate touch event set having a difference less than a threshold value from the touch event set to be processed.

As a result of the searching, when there is a candidate touch event set having a position change similar to that of the touch event set to be processed by the electronic device 100, the electronic device 100 may proceed to operation 1240. When there is no candidate touch event set having a position change similar to that of the touch event set to be processed by the electronic device 100, the electronic device 100 may proceed to operation 1230 to adjust the threshold value and search for a candidate touch event again.

The electronic device 100 may determine whether there is a candidate touch event set in which a relative change of the size of a touch event set to be processed is less than or equal to a threshold value. Similar to the concept of the relative position, the concept of the relative size may be used in the case of the size. That is, when the changes of the sizes of the touch events of the trajectories are similar even though the absolute sizes are different from each other, this is selected as the candidate touch event set. The electronic device 100 may search whether there is a candidate touch event set having a difference less than a threshold value from the touch event set to be processed.

As a result of the searching, when there is a candidate touch event set having the change of the size similar to that of the touch event set to be processed by the electronic device 100, altitude and azimuth angle information may be obtained from the corresponding touch event information among touch events included in the candidate touch event set.

As a result of the searching, when there is no candidate touch event set having a change of the size similar to that of the touch event set to be processed by the electronic device 100, the threshold value may be adjusted and the searching may be performed again.

FIG. 14 is a diagram illustrating example searching for a candidate touch event set in a brush stroke DB, according to various embodiments.

Referring to FIG. 14, the brush stroke DB 800 shows four touch IDs 1001, 1002, 2001, and 2002 corresponding to four touch inputs. However, in practice, information about more touch inputs may be stored. In addition, the brush stroke DB 800 of FIG. 14 includes a brush stroke type field and includes both of an eccentric brush stroke and a middle brush stroke. However, of course, an eccentric brush stroke DB and a middle brush stroke DB may be separately provided.

In the brush stroke DB 800, the electronic device 100 may search for a candidate touch event set having a similar trajectory to that of a touch event set including a touch event to be currently processed and one or more previous touch events. The expressing "having a similar trajectory" may refer, for example, to having a similar change of the position and/or a similar change of the size. For example, when the position change of the touch event set to be processed indicates a "C"-shaped trajectory, the electronic device 100 may search the brush stroke DB 800 for a candidate touch event set close to the "C"-shaped trajectory. For example, when the change of the size of the touch event set to be processed exhibits an increasing trend pattern, the electronic device 100 may search the brush stroke DB 800 for a candidate touch event set having the increasing trend pattern.

For example, the electronic device 100 may search for the candidate touch event set having a similar trajectory to that of the touch event set including a total of four touch events including the touch event to be currently processed and three previous touch events. To this end, the electronic device 100 may search the brush stroke DB 800 for the candidate touch event set in touch event set units including four consecutively arranged touch events. The electronic device 100 may determine, as the candidate touch event set, a touch event set unit having the most similar trajectory to a change of the position and/or a change of the size in the touch event set to be currently processed among touch event set units including four consecutively arranged touch events. For example, when the candidate touch event set in the brush stroke DB 800 illustrated in FIG. 13 is determined as the candidate touch event set corresponding to the touch ID 1002, the electronic device 100 may extract altitude angle information and azimuth angle information of the last touch event information from the candidate touch event set. The electronic device 100 may use the extracted altitude and azimuth angle information to process the touch event to be currently processed.

Various embodiments may be implemented in the form of a non-transitory computer-readable recording medium including instructions to be executable by the computer, such as program modules executable by the computer. The computer-readable recording medium may be any available media that are accessible by the computer, and may include any volatile and non-volatile media and any removable and non-removable media. In addition, the computer-readable recording medium may include any computer storage medium. The computer storage medium may include any volatile, non-volatile, removable, and non-removable media that are implemented in any method or technology for storage of information, such as computer-readable instructions, data structures, program modules, or other data.

The disclosed embodiments may be implemented as a software (S/W) program including instructions stored in a computer-readable storage medium.

The computer may refer, for example, to a device capable of calling instructions stored in a storage medium and performing operations of the disclosed embodiments according to the called instructions, and may include electronic devices according to the disclosed embodiments.

A computer-readable storage medium may be provided in the form of a non-transitory storage medium. The "non-transitory" storage medium may not include a signal and is tangible. This term does not distinguish between a case where data is semi-permanently stored in the storage medium and a case where data is temporarily stored in the storage medium.

In addition, the control method according to the disclosed embodiments may be provided by being included in a computer program product. The computer program products may be traded between a seller and a buyer as commodities.

The computer program product may include an S/W program and a computer-readable storage medium storing the S/W program. For example, the computer program product may include a product (e.g., a downloadable application) in the form of an S/W program that is electronically distributed through an electronic device manufacturer or an electronic market (e.g., Google Play Store, App Store, etc.). For electronic distribution, at least a part of the S/W program may be stored in a storage medium, or may be temporarily generated. In this case, the storage medium may be a storage medium of a server of a manufacturer, a server of an electronic market, or a relay server temporarily storing an SW program.

In a system including a server and a device, the computer program product may include a storage medium of the server or a storage medium of the device. Alternatively, when a third device (e.g., a smartphone) communicatively connected to the server or the device is present, the computer program product may include a storage medium of the third device. Alternatively, the computer program product may include an S/W program itself that is transmitted from the server to the device or the third device or is transmitted from the third device to the device.

In this case, one of the server, the device, and the third device may execute the computer program product to perform the methods according to the disclosed embodiments. Alternatively, two or more of the server, the device, and the third device may execute the computer program product to perform the methods according to the disclosed embodiments in a distributed manner.

For example, the server (e.g., a cloud server or an artificial intelligence server, etc.) may execute the computer program product stored in the server to control the device communicatively connected to the server to perform the methods according to the disclosed embodiments.

As another example, the third device may execute the computer program product to control the device communicatively connected to the third device to perform the method according to the disclosed embodiment. When the third device executes the computer program product, the third device may download the computer program product from the server and execute the downloaded computer program product. Alternatively, the third device may execute the computer program product provided in a preloaded state to perform the methods according to the disclosed embodiments.

In addition, the term "unit" as used herein may be a hardware component such as a processor or a circuit, and/or a software component executable by the hardware component such as a processor.

The foregoing description of the present disclosure is for illustrative purposes only, and those of ordinary skill in the art to which the present disclosure pertains will understand that various modifications into other specific forms may be made thereto without changing the technical spirit or essential features of the present disclosure. Therefore, it should be understood that the example embodiments described above are illustrative in all aspects and are not restrictive. For example, the components described as being singular may be implemented in a distributed manner. Similarly, the components described as being distributed may be implemented in a combined form.

The scope of the present disclosure includes the appended claims and their equivalents, and all changes or modifications derived from the meaning and scope of the claims and equivalent concepts thereof should be construed as falling within the scope of the present disclosure. It will also be understood that any of the embodiment(s) described herein may be used in conjunction with any other embodiment(s) described herein.

What is claimed is:

1. An electronic device comprising:
a display;

a touch sensitive panel;
memory storing one or more instructions; and
at least one processor configured to individually and/or collectively execute the one or more instructions stored in the memory to:
receive a touch input of an input device used as a brush in an application executed by the electronic device through the touch sensitive panel;
detect a change of a size of the touch input based on sizes of touch events on the touch sensitive panel received for a specified time;
identify, from among a plurality of different brush stroke types for brush strokes using the brush, a brush stroke type corresponding to the detected change of the size of the touch input;
obtain, from a database corresponding to the identified brush stroke type, trajectory information corresponding to the touch input, the trajectory information including azimuth and/or altitude information for the input device; and
process the touch input according to the obtained trajectory information and output the processed touch input on the display.

2. The electronic device of claim 1, wherein the at least one processor is further configured to individually and/or collectively execute the one or more instructions to:
detect the change of the size of the touch input based on a difference between a first size of a first touch event at a first time point and a second size of a second touch event at a second time point among the touch events on the touch sensitive panel.

3. The electronic device of claim 1, wherein the at least one processor is further configured to individually and/or collectively execute the one or more instructions to:
identify the received touch input as a first brush stroke type based on a change of a size of an area corresponding to the touch input exceeding a threshold value; and
identify the received touch input as a second brush stroke type based on the change of the size of the area corresponding to the touch input not exceeding the threshold value.

4. The electronic device of claim 1, wherein the memory comprises a plurality of databases respectively corresponding to each of a plurality of brush stroke types, and
each of the plurality of databases comprises information about a plurality of trajectories obtained based on a touch input according to brush strokes of a corresponding brush stroke type made using an active stylus.

5. The electronic device of claim 4, wherein the trajectory information comprises first trajectory information corresponding to a first brush stroke type and second trajectory information corresponding to a second brush stroke type,
the first trajectory information comprises a plurality of first trajectory information obtained based on a plurality of touch inputs made according to the first brush stroke type, each of the plurality of first trajectory information comprising information about a plurality of touch events included in a touch input representing each trajectory, and
the second trajectory information comprises a plurality of second trajectory information obtained based on a plurality of touch inputs made according to the second brush stroke type, each of the plurality of second trajectory information comprising information about a plurality of touch events included in a touch input representing each trajectory.

6. The electronic device of claim 5, wherein the information about the plurality of touch events comprises at least one of a touch event occurrence location, a touch event area size, a touch event occurrence time, a position vector, a velocity vector, an altitude angle, or an azimuth angle.

7. The electronic device of claim 6, wherein the at least one processor is further configured to individually and/or collectively execute the one or more instructions to:
based on the received touch input being identified as the first brush stroke type, obtain a first database corresponding to the first brush stroke type;
search for a candidate touch event from the first database using a position vector and a velocity vector of each of the touch events included in the touch input, and obtain altitude or azimuth angle information from information about a candidate touch event found by the search; and
process the touch input using the altitude or azimuth angle information.

8. The electronic device of claim 7, wherein the at least one processor is further configured to individually and/or collectively execute the one or more instructions to:
identify, as the candidate touch event, a touch event in which a difference between a position vector and a velocity vector of each of the touch events included in the touch input and a position vector and a velocity vector of the touch events in the first database is less than a threshold value.

9. The electronic device of claim 6, wherein the at least one processor is further configured to individually and/or collectively execute the one or more instructions to:
based on the received touch input being identified as the first brush stroke type, obtain a first database corresponding to the first brush stroke type;
search for a candidate touch event from the first database using a position change or a change of the size of each of the touch events included in the touch input, and obtain altitude or azimuth angle information from information about a candidate touch event found by the search; and
process the touch input using the altitude or azimuth angle information.

10. The electronic device of claim 1, wherein the input device comprises a passive input device.

11. A method of operating an electronic device including a display and a touch sensitive panel, the method comprising:
receiving a touch input of an input device used as a brush in an application executed by the electronic device through the touch sensitive panel;
detecting a change of a size of the touch input based on sizes of touch events on the touch sensitive panel received for a specified time;
identifying, from among a plurality of brush stroke types for brush strokes using the brush, a brush stroke type corresponding to the detected change of the size of the touch input;
obtaining, from a database corresponding to the identified brush stroke type, trajectory information corresponding to the touch input, the trajectory information including azimuth and/or altitude information for the input device; and
processing the touch input according to the obtained trajectory information and outputting the processed touch input on the display.

12. The method of claim 11, further comprising detecting the change of the size of the touch input based on a difference between a first size of a first touch event at a first time point and a second size of a second touch event at a second time point among the touch events on the touch sensitive panel.

13. The method of claim 11, further comprising:
identifying the received touch input as a first brush stroke type based on the change of the size of the touch input exceeding a threshold value, and
identifying the received touch input as a second brush stroke type based on the change of the size of the touch input not exceeding the threshold value.

14. The method of claim 11, wherein the electronic device comprises a plurality of databases respectively corresponding to each of the plurality of brush stroke types, and
each of the plurality of databases comprises information about a plurality of trajectories obtained based on a touch input according to brush strokes of a corresponding brush stroke type made using an active stylus.

15. The method of claim 14, wherein the trajectory information comprises first trajectory information corresponding to a first brush stroke type and second trajectory information corresponding to a second brush stroke type,
the first trajectory information comprises a plurality of first trajectory information obtained based on a plurality of touch inputs made according to the first brush stroke type, each of the plurality of first trajectory information comprising information about a plurality of touch events included in a touch input representing each trajectory, and
the second trajectory information comprises a plurality of second trajectory information obtained based on a plurality of touch inputs made according to the second brush stroke type, each of the plurality of second trajectory information comprising information about a plurality of touch events included in a touch input representing each trajectory.

16. A non-transitory computer-readable recording medium having recorded thereon one or more programs executable by at least one processor of an electronic device including a display and a touch sensitive panel, wherein the one or more programs, when executed by the processor, cause the electronic device to perform operations comprising:
receiving a touch input of an input device used as a brush in an application executed by the electronic device through the touch sensitive panel;
detecting a change of a size of the touch input based on sizes of touch events on the touch sensitive panel received for a specified time;
identifying, from among a plurality of different brush stroke types for brush strokes using the brush, a brush stroke type corresponding to the detected change of the size of the touch input;
obtaining, from a database corresponding to the identified brush stroke type, trajectory information corresponding to the touch input, the trajectory information including azimuth and/or altitude information for the input device; and
processing the touch input according to the obtained trajectory information and outputting the processed touch input on the display.

* * * * *